United States Patent
Lin et al.

(10) Patent No.: US 9,419,785 B1
(45) Date of Patent: Aug. 16, 2016

(54) INITIAL SYNCHRONIZATION METHOD AND APPARATUS ASSISTED BY INHERENT DIVERSITY OVER TIME-VARYING FREQUENCY-SELECTIVE FADING CHANNELS

(71) Applicant: National Central University, Taoyuan County (TW)

(72) Inventors: Jia-Chin Lin, Taoyuan County (TW); Yu-Ting Sun, Taoyuan County (TW)

(73) Assignee: NATIONAL CENTRAL UNIVERSITY, Taoyuan County (TW)

( * ) Notice: Subject to any disclaimer, the term of this patent is extended or adjusted under 35 U.S.C. 154(b) by 0 days.

(21) Appl. No.: 14/698,419

(22) Filed: Apr. 28, 2015

(51) Int. Cl.
*H04L 7/00* (2006.01)

(52) U.S. Cl.
CPC ............ *H04L 7/0087* (2013.01); *H04L 7/0004* (2013.01); *H04L 7/0058* (2013.01)

(58) Field of Classification Search
CPC .... H04L 7/0087; H04L 7/0004; H04L 7/0058
See application file for complete search history.

(56) References Cited

U.S. PATENT DOCUMENTS

| 7,369,631 | B1 * | 5/2008 | Gifford | ............... | H04B 7/0837 |
| | | | | | 375/346 |
| 2006/0072514 | A1 * | 4/2006 | Kent | .................... | H04B 7/0413 |
| | | | | | 370/335 |
| 2007/0025476 | A1 * | 2/2007 | Rasmussen | ......... | H04L 27/0014 |
| | | | | | 375/343 |

OTHER PUBLICATIONS

Jia-Chin Lin, "IEEE Transactions on Wireless Communications," IEEE Communications Society and the Signal Processing Society, vol. 13, No. 5, May 1, 2014.

* cited by examiner

*Primary Examiner* — Vineeta Panwalkar
(74) *Attorney, Agent, or Firm* — WPAT, PC; Justin King

(57) ABSTRACT

The present invention relates to an initial synchronization apparatus assisted by inherent diversity over time-varying frequency-selective fading channels. Based on motivation from statistical derivations, the present invention provides a novel initial synchronization method for estimating timing error and carrier frequency offset (CFO) by embedding matched filters into RAKE fingers to approach modified CramerRao lower bounds (MCRLBs). In addition, the present invention is then built to approach modified Cramer-Rao lower bounds by taking advantage of a maximum ratio combining (MRC) criterion. In practice, the proposed technique can significantly outperform a conventional initial synchronization technique on the timing error and CFO estimations over multipath fading channels.

17 Claims, 12 Drawing Sheets

INITIAL SYNCHRONIZATION METHOD AND APPARATUS ASSISTED BY INHERENT DIVERSITY OVER TIME-VARYING FREQUENCY-SELECTIVE FADING CHANNELS

BACKGROUND OF THE INVENTION

1. Field of the Invention

The present invention relates to an initial synchronization method and apparatus, and more particularly to an initial synchronization method and apparatus for estimating timing error and frequency offset.

2. Related Art

Timing recovery and carrier frequency offset (CFO) compensation are crucial for any wireless communication application. Pseudo-noise (PN) sequences are often employed to serve as training preambles for the purpose of time synchronization in a variety of wireless communications. Although PN sequences can support high-resolution time synchronization because of their good correlation properties by taking advantage of PN matched filtering (PN MF), they are vulnerable to the CFO [3]-[8]. The vulnerability is mainly because the cross-correlation between the received signal and a locally generated PN sequence can be destroyed by undesired phase increments (or decrements) in the correlation period of the PN MF, in which a non-negligible CFO exists.

The CFO occurring in mobile communications is mainly caused by mismatch of the local oscillator at the receiving end, meanwhile the relative movement, however, leads to a Doppler spread, which is inevitably caused by many reflections from surroundings. The CFO is more dominant than a Doppler frequency even in a very-high-mobility environment.

A particular synchronization burst, called a dual-chirp signal, was originally discussed in Geostationary Earth Orbit (GEO) Mobile Radio (GMR) mobile-satellite communications and its properties have been investigated in detail in a previous work and its references. Several studies have employed chirp signals as training sequences for time-domain (TD) synchronization or CFO estimation in wireless orthogonal-frequency-division-multiplexing (OFDM) communication systems.

Zadoff-Chu (ZC) sequences, which are also chirp-like sequences, have been employed as random access preambles, primary synchronization sequences for cell search and reference sequences for channel estimation (CE) in the Third-Generation Partnership Project (3GPP) Long-Term Evolution, which is a mobile communication specification. The synchronization mechanisms studied in the previous works generally utilize autocorrelation or cross-correlation evaluation to estimate the time error and CFO. However, rigorous analyses based on statistical derivations have been omitted, especially in multi-path fading environments.

SUMMARY OF THE INVENTION

An object of the present invention is to provide an initial synchronization method and apparatus assisted by inherent diversity over time-varying frequency-selective fading channels, wherein the more precise estimation of timing error and frequency offset is achieved based on the rake architecture.

In view of this, the present invention provides an initial synchronization apparatus for receiving a received signal comprising a training sequence. The initial synchronization apparatus comprises an over-sampling unit, a receiving buffer, a channel estimation unit, D matched filter operating units, a time maximum ratio combining unit and a time decision unit. The over-sampling unit samples the received signal to obtain N over-sampling signals. The receiving buffer is coupled to the over-sampling unit, has N storage units, and stores the $0^{th}$~$(N-1)^{th}$ over-sampling signals. The channel estimation unit is coupled to the receiving buffer and performs a channel estimation on the over-sampling signals according to a local training sequence to obtain D channel tap-weighting coefficients. The local training sequence comprises D discrete training signals represented as $s[0]$, $s[1]$, ..., $s[D-1]$.

Each of the D matched filter operating units has D input terminals. The $J^{th}$ input terminal of each of the matched filter operating units receives the over-sampling signal of the $(M_T \times J)^{th}$ receiving buffer. A matched filtering operation is performed on the over-sampling signal of the $K^{th}$ input terminal of the $(m')^{th}$ matched filter operating unit and a conjugate of the discrete training signal $s[MOD(K-m')]$ to obtain a $K^{th}$ matched operation result. The $(m')^{th}$ matched filter operating unit combines all the matched operation results into a $(m')^{th}$ filter signal, where $MOD(x)$ represents a remainder obtained after x is divided by D. The time maximum ratio combining unit is coupled to the D matched filter operating units and the channel estimation unit, and performs an weight-product operation on the $I^{th}$ filter signal and a conjugate of the $I^{th}$ channel tap-weighting coefficient to obtain an $I^{th}$ time tap-weighting coefficient result. The time maximum ratio combining unit combines all the time tap-weighting coefficient results into a time combining signal.

Every predetermined time, the receiving buffer replaces data of the $M^{th}$ storage unit with data of the $(M-1)^{th}$ storage unit, and updates the first storage unit. Every predetermined time, a new time combining signal is generated. The $Q^{th}$ time combining signal is generated in the $Q^{th}$ predetermined time. The time decision unit is coupled to the time maximum ratio combining unit, collects R time combining signals, performs a maximum estimation on the R time combining signals, finds out a maximum time combining signal, and extracts a time index corresponding to the maximum time combining signal as a timing error estimation value, where D, N, and $M_T$ are positive integers, $N \geq M_T \times D$, J, K, m', I are integers ranging from 0 to D−1, M is a positive integer, $2 \leq M \leq N$, R is a positive integer, and Q is a real number.

The initial synchronization apparatus for receiving a received signal comprising a training sequence according to a preferred embodiment of the present invention, further comprises a frequency maximum ratio combining unit, an array temporarily storing circuit, a Fourier transform unit and a frequency decision unit. The frequency maximum ratio combining unit is coupled to the matched filter operating units and the channel estimation unit, and performs an weight-product operation on each of the matched operation results of the $P^{th}$ matched filter operating unit and a conjugate of the corresponding channel tap-weighting coefficient, wherein the weight-product operation is performed on the $U^{th}$ matched operation result of the $P^{th}$ matched filter operating unit and a conjugate of the $U^{th}$ channel tap-weighting coefficient to obtain the $U^{th}$ frequency tap-weighting coefficient result. The frequency maximum ratio combining unit combines all the frequency tap-weighting coefficient results into a frequency combining vector, and the frequency combining vector comprises frequency combining signals, wherein the $V^{th}$ frequency combining signal is a sum of the $V^{th}$ frequency tap-weighting coefficient results corresponding to all the matched filter operating units.

Every predetermined time, the receiving buffer replaces the data of the $M^{th}$ storage unit with the data of the $(M-1)^{th}$ storage unit, and updates the first storage unit, and every predetermined time, the frequency maximum ratio combining unit generates a new frequency combining vector, wherein the frequency maximum ratio combining unit generates the $Q^{th}$ frequency combining vector in the $Q^{th}$ predetermined time. The array temporarily storing circuit is coupled to the frequency maximum ratio combining unit and stores R frequency combining vectors. The Fourier transform unit is coupled to the array temporarily storing circuit, extracts a specific frequency combining vector from the array temporarily storing circuit according to the timing error estimation value, and performs a Fourier transform to obtain multiple frequency domain transform signals. The frequency decision unit is coupled to the Fourier transform unit, receives the multiple frequency domain transform signals, performs a maximum estimation on the multiple frequency domain transform signals, finds out a maximum frequency domain transform signal, and extracts a frequency index, corresponding to the maximum frequency domain transform signal, as a frequency offset estimation value, where P, U and V are integers ranging from 0 to D−1.

The present invention further provides a initial synchronization method. The initial synchronization method comprises the steps of: receiving a received signal, which comprises a training sequence; sampling the received signal to obtain N over-sampling signals; providing a receiving buffer, which has N storage units, and stores the $0^{th}$~$(N-1)^{th}$ over-sampling signals; performing a channel estimation on the over-sampling signals according to a local training sequence to obtain D channel tap-weighting coefficients, wherein the local training sequence comprises D discrete training signals represented as s[0], s[1], . . . , s[D−1]; performing D correlated operations to obtain D filter signals, wherein the over-sampling signal of the $(M_T \times J)^{th}$ receiving buffer is received in each correlated operation to perform D correlated operations over D over-sampling signals, wherein J=0,1,2,3, . . . , D−1, wherein each correlated operation comprises a plurality of filtering operations and a combination operation, the $K^{th}$ filtering operations of the $(m')^{th}$ correlated operation is a matched filtering operation which is performed on the $(M_T \times K^{th}$ over-sampling signal and a conjugate of the discrete training signal s[MOD(K−m′)] to obtain a $K^{th}$ matched operation result, wherein the $(m')t^h$ combination operation combines all the matched operation results of the $(m')^{th}$ correlated operation into a $(m')^{th}$ filter signal, where MOD(x) represents a remainder obtained after x is divided by D; performing a time maximum ratio combining operation, which performs an weight-product operation on the $I^{th}$ filter signal and a conjugate of the $I^{th}$ channel tap-weighting coefficient to obtain an $I^{th}$ time tap-weighting coefficient result, and the time maximum ratio combining operation combines all the time tap-weighting coefficient results into a time combining signal, wherein every predetermined time, the receiving buffer replaces data of the $M^{th}$ storage unit with data of the $(M-1)^{th}$ storage unit, and updates the first storage unit, and every predetermined time, a new time combining signal is generated, wherein the $Q^{th}$ time combining signal is generated in the $Q^{th}$ predetermined time; and performing a time decision operation, which collects R time combining signals and performs a maximum estimation on the R time combining signals to find out a maximum time combining signal, and extracts a time index corresponding to the maximum time combining signal as a timing error estimation value; where D, N, and $M_T$ are positive integers, $N \geq M_T \times D$, J, K, m', I are integers ranging from 0 to D−1, M is a positive integer, $2 \leq M \leq N$, R is a positive integer, and Q is a real number.

The spirit of the present invention is to use the decision-directed mechanism and to collect the message energy (comprising timing and frequency offset information) propagated in multi-paths based on the rake architecture to achieve the gain of the inherent frequency diversity. Thus, the timing and frequency synchronization system can be operated in the mobile communication environment and the environments with the multi-path interference and the low signal-to-noise ratio.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

Figure 1:
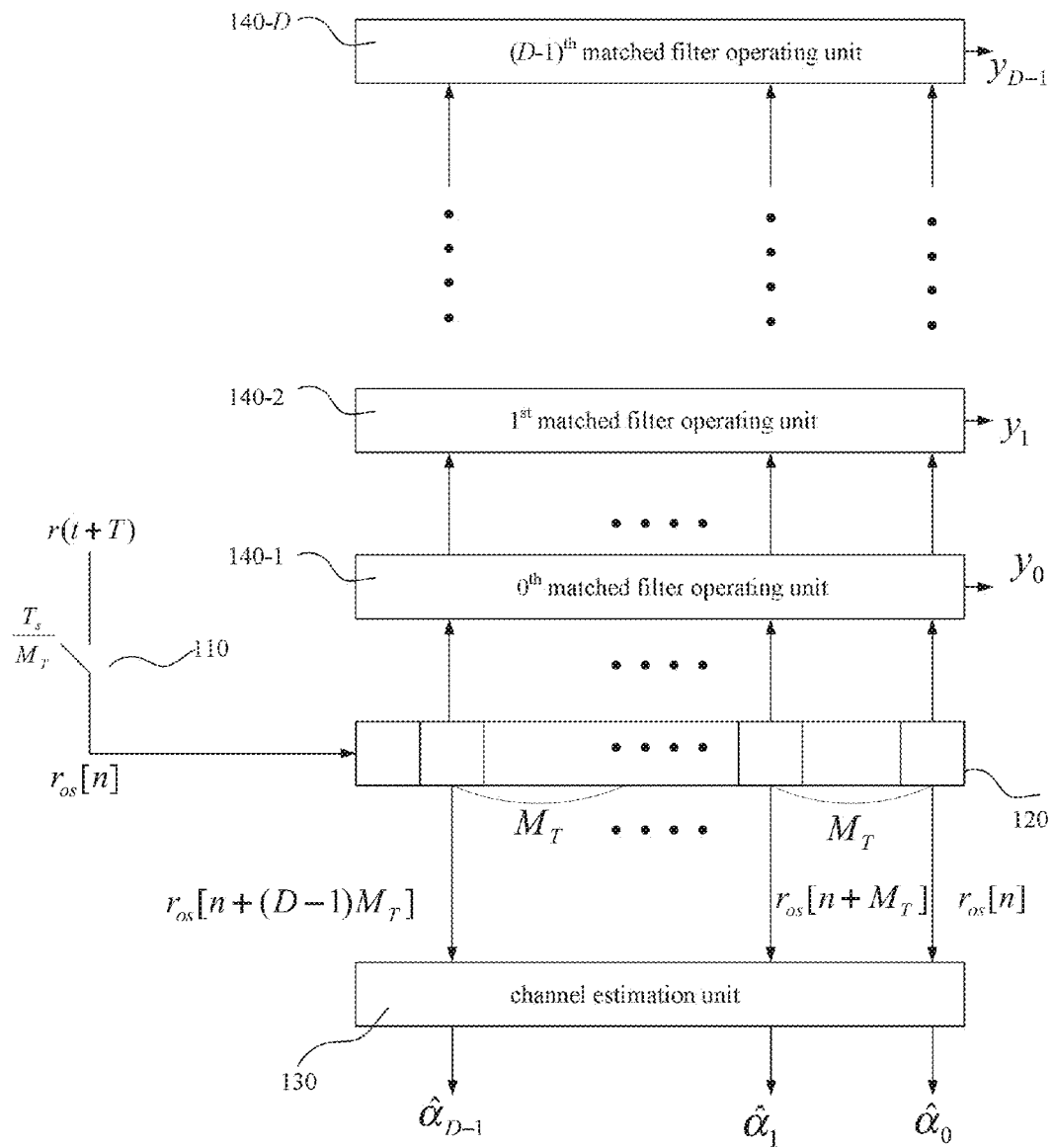
FIGS. 1 and 2 are schematic block diagrams showing an initial synchronization apparatus according to an embodiment of the present invention.
Figure 2:
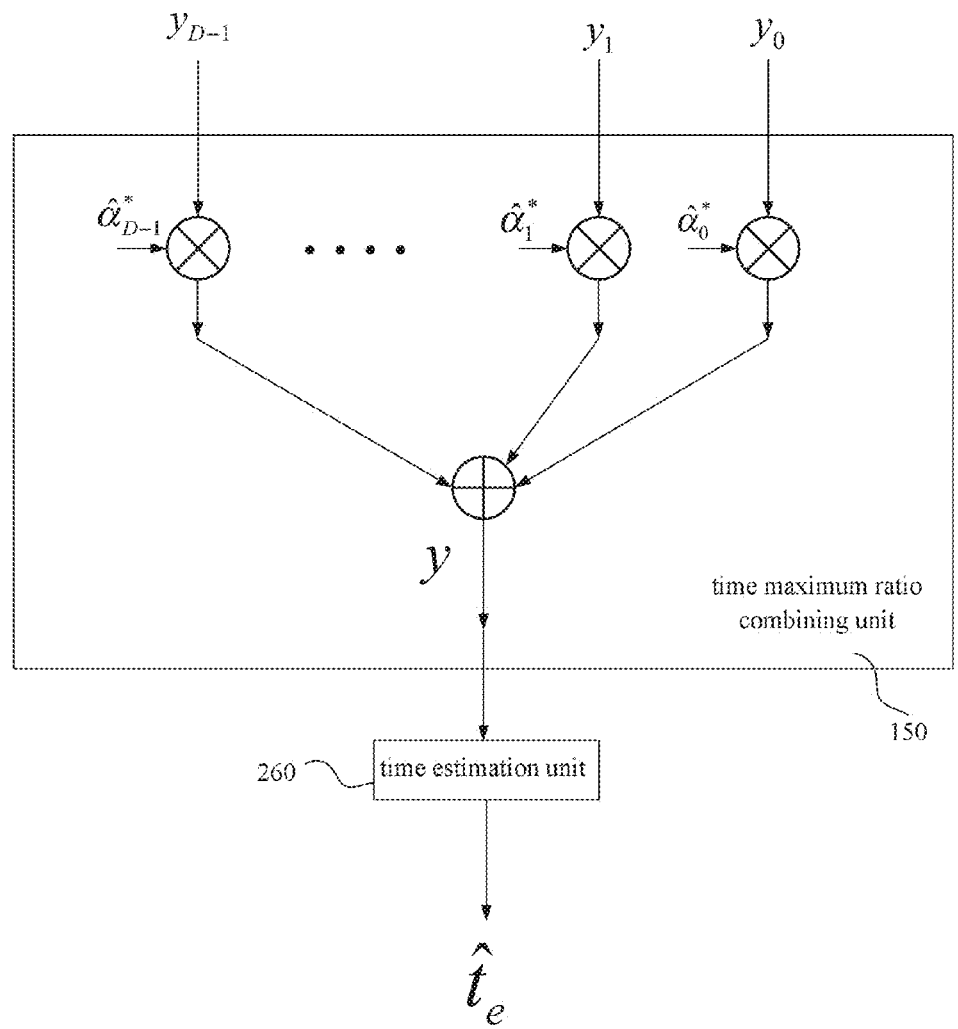

In a digital communication system, training preambles are placed on the transmitted signal by the transmitter, and the timing error and frequency offset are estimated by the receiver according to the received training preambles and the good autocorrelation of the training preambles. In an embodiment of the present invention, an initial synchronization apparatus, which is for estimating the timing error and applicable to time-varying frequency-selective fading channel environments, is designed based on the statistical derivations. The initial synchronization apparatus according to the embodiment of the present invention is depicted in FIGS. 1 and 2. FIGS. 1 and 2 are schematic block diagrams showing an initial synchronization apparatus according to an embodiment of the present invention.

Referring to FIGS. 1 and 2, the initial synchronization apparatus comprises an over-sampling unit 110, a receiving buffer 120, a channel estimation unit 130, D matched filter operating units 140-1 to 140-D, a time maximum ratio combining unit 150 and a time estimation unit 160. The over-sampling unit 110 samples a received signal r(t+T) to obtain N over-sampling signals $r_{os}[n]$. The receiving buffer 120 coupled to the over-sampling unit 110 which has N storage units for storing $0^{th}$ to $(D-1)^{th}$ over-sampling signals. The channel estimation unit 130 coupled to the receiving buffer 120 performs a channel estimation on the over-sampling signals $r_{os}[n]$ according to a local training sequence to obtain D channel tap-weighting coefficients, represented by $\hat{\alpha}_0$, $\hat{\alpha}_1, \ldots, \hat{\alpha}_{D-1}$ in the drawing.

The D matched filter operating units 140-1 to 140-D are coupled to the receiving buffer 120. Each matched filter operating unit has D input terminals. The $J^{th}$ input terminal of each matched filter operating unit receives the over-sampling signal of the $(M_T \times J)^{th}$ receiving buffer. In this embodiment, the local training sequence comprises D discrete training signals, represented as s[0], [1], ..., s[D−1]. A matched filtering operation is performed on the over-sampling signal of the $K^{th}$ input terminal of the $(m')^{th}$ matched filter operating unit and the discrete training signal s[MOD(K−m')] to obtain a $K^{th}$ matched operation result, wherein the $(m')^{th}$ matched filter operating unit synthesizes all the matched operation results into the $(m')^{th}$ filter signal, wherein MOD(x) represents the remainder obtained after x is divided by D.

Referring next to FIG. 2, the time maximum ratio combining unit 150 is coupled to the D matched filter operating units 140-1 to 140-D and the channel estimation unit 130. The time maximum ratio combining unit performs an weight-product operation on the $I^{th}$ filter signal and the $I^{th}$ channel tap-weighting coefficient to obtain the $I^{th}$ time tap-weighting coefficient result. The time maximum ratio combining unit 150 synthesizes all the time tap-weighting coefficient results into a time combining signal y.

In this embodiment, the receiving buffer 120 replaces the data of the $M^{th}$ storage unit with the data of the $(M-1)^{th}$ storage unit and updates the $1^{st}$ storage unit at each predetermined time, and generates a new time combining signal y at each predetermined time, wherein the $Q^{th}$ time combining signal is generated at the $Q^{th}$ predetermined time. The time estimation unit 160 is coupled to the time maximum ratio combining unit 150 for collecting R time combining signals, and performing an maximum estimation on the R time combining signals to find a maximum time combining signal, and obtaining the time index corresponding to the maximum time combining signal to serve as a timing error estimation value $\hat{t}_e$.

Each of the above-mentioned variables $D \cdot N \cdot M_T$ is a positive integer, where $N \geq M_T \times D$; J, K and m' are integers ranging from 0 to D−1; M is a positive integer, where $2 \leq M \leq N$; R is a positive integer; and Q is a real number.

In the following, for the sake of illustration of this embodiment, the training preambles are dual-chirp bursts, for example. Herein, the equation of the baseband equivalent signal of the dual-chirp burst may be represented as follows:

$$s'(t) = \sqrt{\frac{2E_T}{T}} \cos(\pi\mu t^2) \Pi\left(\frac{t}{T}\right)$$

$$\sqrt{\frac{E_T}{2}} (s'_u(t) + s'_d(t))$$

where $\mu$ is a parameter for determining a sweeping bandwidth. In the above-mentioned equation, the dual-chirp burst comprises an up-chirp burst and a down-chirp burst, and the equation thereof is represented as:

$$s'_u(t) = \sqrt{\frac{1}{T}} \exp(j\pi\mu t^2) \Pi\left(\frac{t}{T}\right)$$

-continued $$s'_d(t) = \sqrt{\frac{1}{T}} \exp(-j\pi\mu t^2) \Pi\left(\frac{t}{T}\right)$$

In the above-mentioned equation, the equation of the $\Pi(t)$ unit rectangular pulse may be represented as $$\Pi(t) = \begin{cases} 1, & -\frac{1}{2} < t < \frac{1}{2} \\ 0, & \text{elsewhere} \end{cases}$$

Figure 3:
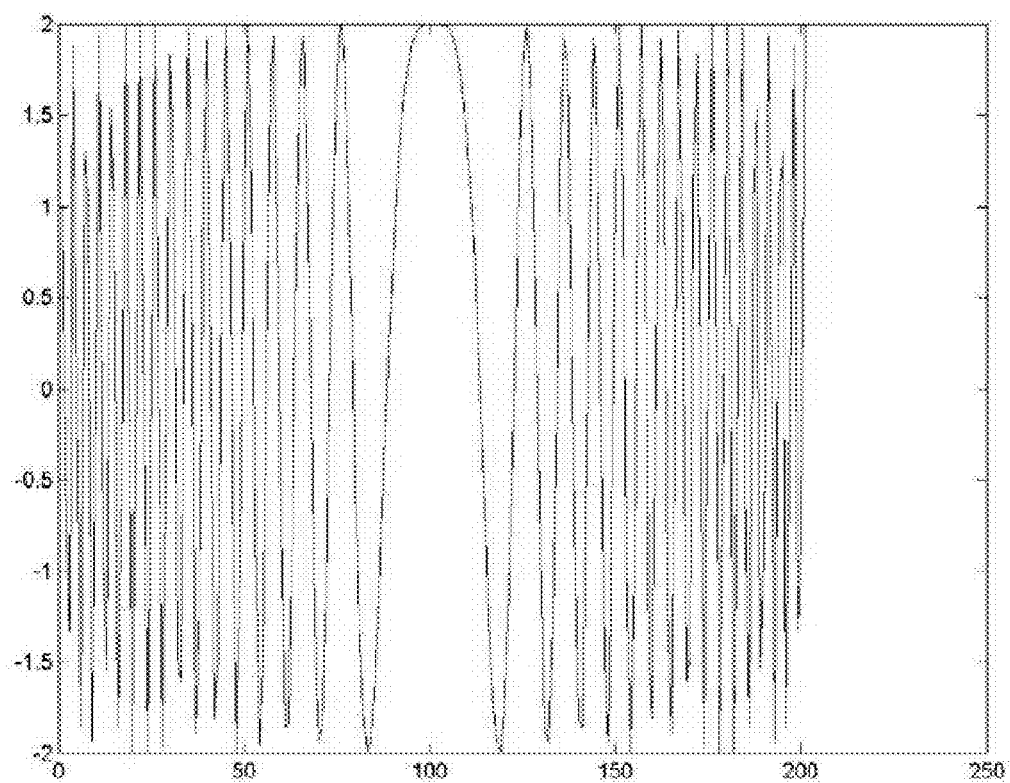
FIG. 3 is a schematic view showing dual-chirp burst waveforms.

The instantaneous phase and frequency of $s_u'(t)$ and $s_d'(t)$ are represented as $$\phi(t) = \pm \pi\mu t^2 \text{ and}$$

$$v(t) = \frac{1}{2\pi} \frac{d}{dt} \phi(t) = \pm \mu t,$$

respectively, where $-T/2 < t < T/2$. The instantaneous frequency of the up-chirp burst $s_u'(t)$ extends from $-\mu T/2$ to $\mu T/2$. In other words, the frequency of the signal in a given period rises from a low frequency to a high frequency. The instantaneous frequency of the down-chirp burst $s_d'(t)$ extends from $\mu T/2$ to $-\mu T/2$. In other words, the frequency of the signal in a given period falls from the high frequency to the low frequency. Thus, in the period (−T/2, T/2), the frequency span of the dual-chirp burst is $B = \mu T$. FIG. 3 is a schematic view showing dual-chirp burst waveforms. In FIG. 3, the horizontal axis represents the time, and the vertical axis represents the frequency. Because the dual-chirp filter has the good autocorrelation property, for the dual-chirp burst outputted from the transmitting end, the receiving end can calculate and estimate offsets of time and frequency by matched filters and the peak time obtained after decision is made. Although this embodiment is illustrated by taking the dual-chirp burst as an example, those skilled in the art should understand that the present invention is also applicable to the case, in which the training preamble signal is the PN sequence, or other types of training sequences, such as the chirp-like sequence.

For the sake of the application to the causal system, the above-mentioned signal s'(t) is shifted by T/2 in the time domain, and is represented as s(t). s(t)=s'(t−(T/2)) is represented as:

$$s(t) = \sqrt{\frac{E_T}{2}} (s_u(t) + s_d(t)) \tag{1}$$

where, $$s_u(t) = \sqrt{\frac{1}{T}} \exp\left(j\pi\mu\left(t - \frac{T}{2}\right)^2\right) \Pi\left(\frac{t - \frac{T}{2}}{T}\right)$$

$$s_d(t) = \sqrt{\frac{1}{T}} \exp\left(-j\pi\mu\left(t - \frac{T}{2}\right)^2\right) \Pi\left(\frac{t - \frac{T}{2}}{T}\right).$$

In the embodiment of the present invention, based on the statistical derivations, the initial synchronization apparatus applicable to the time-varying frequency-selective fading channel environments is designed to perform the estimations of the timing error and the carrier frequency offset. FIGS. 4 to 9 are schematic system block diagrams showing timing error estimation portions in the initial synchronization apparatus according to the embodiment of the present invention.

Figure 4:
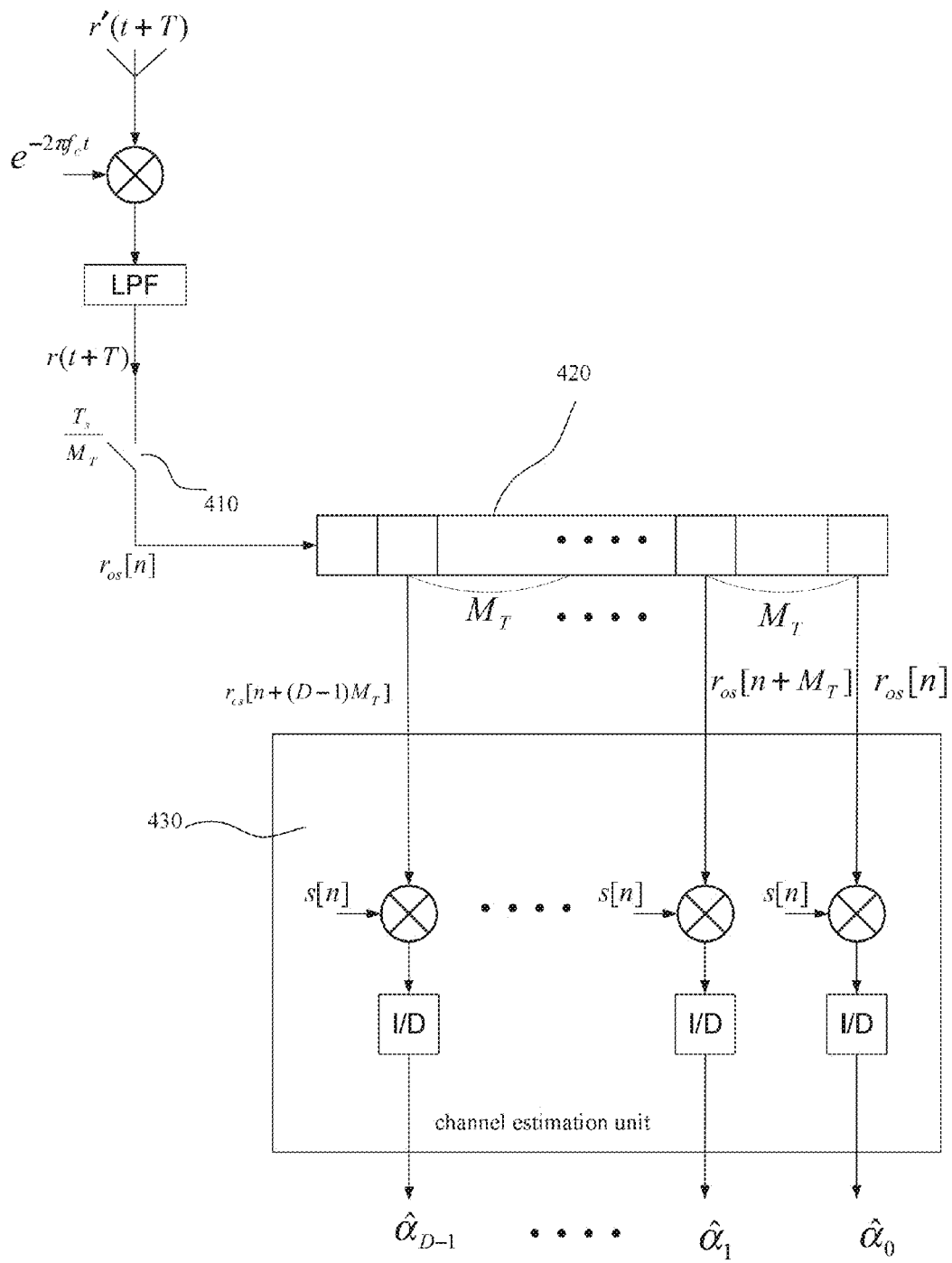
FIGS. 4 to 9 are schematic system block diagrams showing timing error estimation portions in the initial synchronization apparatus according to the embodiment of the present invention.

Referring first to FIG. 4, the high frequency received signal r'(t+T) is down-converted and inputted to an analog low-pass filter to obtain a received signal r(t+T). The bandwidth of the analog low-pass filter may be designed as B/2, for example. The received signal equation may be represented as:

$$r(t) = e^{j(2\pi\epsilon t+\phi_0)} \sum_{m=0}^{M-1} \alpha'_m s(t-mT_s-\tau) + w'(t) \quad (2)$$

$$r(t) = e^{j2\pi\epsilon t} \sum_{m=0}^{M-1} \alpha_m s(t-mT_s-\tau) + w'(t).$$

$\alpha'_m$ represents the tap-weighting coefficient of the $(m)^{th}$ complex channel, $\tau$ and $\epsilon$ represent the estimated timing error and CFO, and $\Phi_0$ represents the initial phase error. $T_s=1/B$, wherein B represents the null-to-null bandwidth of the transmitted preamble signal or relatively transmitted training signal. In the above-mentioned equation, $\alpha_m = \alpha'_m e^{j\Phi_0}$, m=0,1, 2,...,M-1, $\omega'(t)$ represents the additive white Gaussian noise AWGN, and $\omega'(t)=\omega'_I(t)+j\omega'_Q(t)$.

Then, an over-sampling unit 410 samples the received signal r(t+T) to obtain an over-sampling signal $r_{os}[n]$, and the over-sampling signal $r_{os}[n]$ is stored into a receiving buffer 420. In this embodiment, the sampling frequency is configured as $1/t_s$, the value thereof is represented as $M_T/T_s$, where $T_s=1/B$. In other words, in each symbol time $T_s$, the received signal is sampled by $M_T$ times. In this embodiment, the length N of the receiving buffer is configured as N≥$M_T$D, where $M_T$ and D are positive integers, the values thereof are hardware design values. The value of the above-mentioned over-sampling signal $r_{os}[n]$ may be represented as $r_{os}[n]=r(nt_s+T)$.

The channel estimation unit 430 receives the over-sampling signal $r_{os}[n]$, and performs the channel estimation according to the over-sampling signal $r_{os}[n]$, wherein an over-sampling signal $r_{os}[n]$ is extracted every period of $M_T$ to perform the channel estimation. The extracted over-sampling signals are represented as $r_{os}[n]$, $r_{os}[n+M_T]$, ..., $r_{os}[n+(D-1)M_T]$..., and the number of the extracted over-sampling signals is D. In other words, the over-sampling signals are extracted every interval of time $T_s$. Next, the extracted over-sampling signals are multiplied by the local training signal s[n], and then respectively pass through multiple digital low-pass filters, so that multiple channel tap-weighting coefficients, represented as $\hat{\alpha}_0, \hat{\alpha}_1, \ldots, \hat{\alpha}_{D-1}, \ldots$, are obtained. In this embodiment, the local training signal is a digital signal of the dual-chirp burst, for example.

In the channel estimation unit according to the embodiment of the present invention, the digital low-pass filters are implemented by integrate-and-dump (I/D) filters. However, those skilled in the art should know that the digital low-pass filters of the present invention may also be implemented by other types of filters, such as finite impulse response (FIR) filters or infinite impulse response (FIR) filters. In addition, although the channel estimation unit 430 of this embodiment extracts multiple channel tap-weighting coefficients $\hat{\alpha}_0, \hat{\alpha}_1, \ldots, \hat{\alpha}_{D-1}, \ldots$ through multiple multipliers and multiple digital low-pass filters, those skilled in the art should know that any channel estimation technique, which can extract the channel tap-weighting coefficient, can be applied to the present invention. Thus, the implementation means of the channel estimation of this embodiment cannot restrict the present invention.

Figure 5:
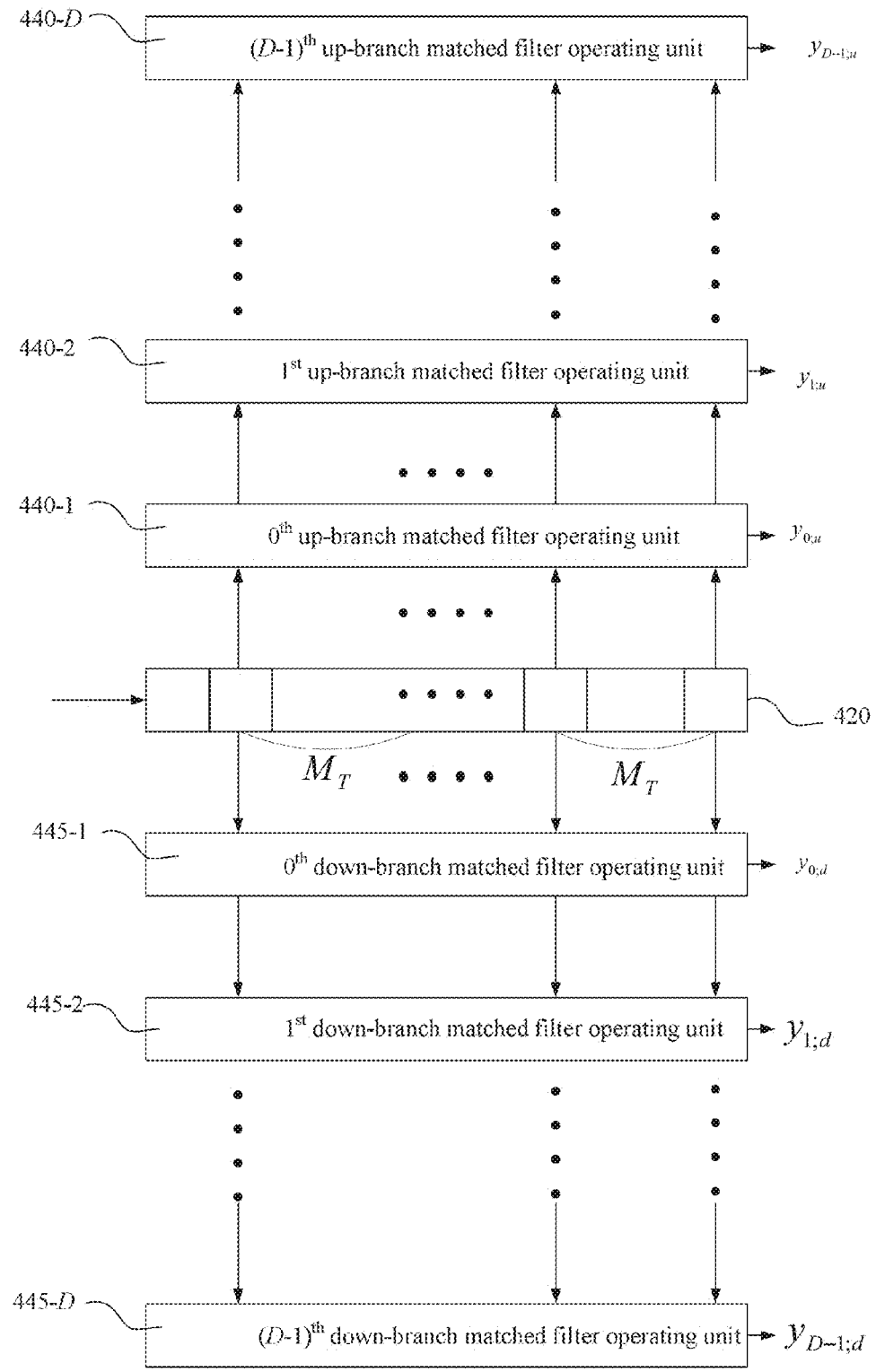

Referring next to FIG. 5, this embodiment further comprises D up-branch (UB) matched filter operating units 440-1~440-D and D down-branch (DB) matched filter operating units 445-1~445-D coupled to the receiving buffer 420. Each of the up-branch matched filter operating units 440-1~440-D and each of the down-branch matched filter operating units 445-1~445-D receive the over-sampling signal $r_o[n]$ stored in the buffer 420, and the received signals are $r_{os}[n]$, $r_{os}[n+M_T]$, ..., $r_{os}[n+(D-1)M_T]$.

Figure 6:
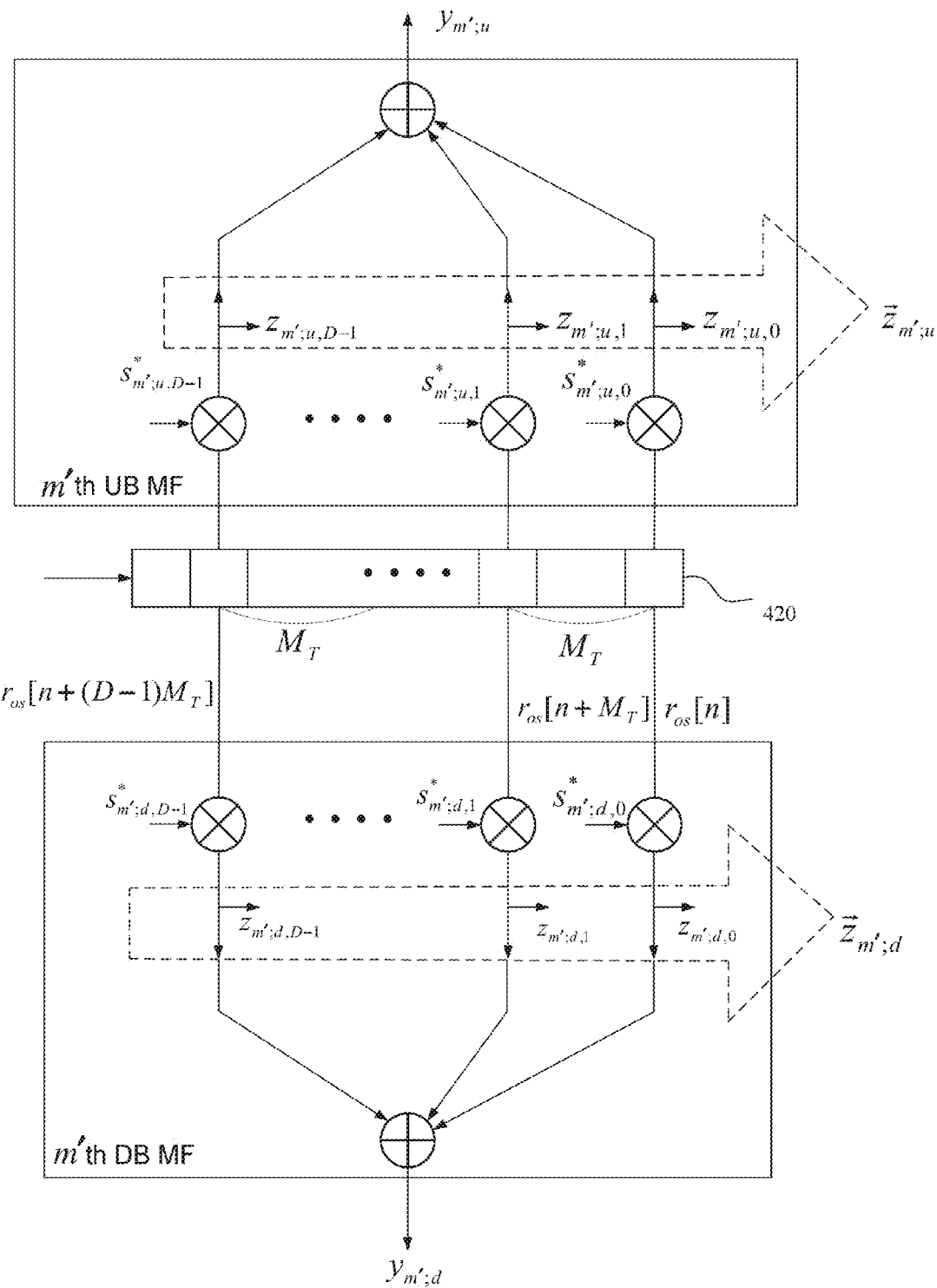

For the sake of the illustration of this embodiment, the $(m')^{th}$ up-branch matched filter operating unit (m'th UB MF) and the $(m')^{th}$ down-branch matched filter operating unit (m'th DB MF) will be described. FIG. 6 shows circuit blocks of the $(m')^{th}$ up-branch matched filter operating unit and the $(m')^{th}$ down-branch matched filter operating unit. The $(m')^{th}$ up-branch matched filter operating unit (m'th UB MF) has D input terminals, coupled to the receiving buffer 420, for receiving the over-sampling signals $r_{os}[n]$, $r_{os}[n+M_T]$, ..., $r_{os}[n+(D-1)M_T]$, wherein the extracted signals are multiplied by the conjugates of the corresponding up-branch training sequences, respectively, through D multipliers to obtain D up-branch matched operation results represented as $z_{m';u,0}, z_{m';u,1}, \ldots, z_{m';u,D-1}$. All the up-branch matched operation results are synthesized into the $(m')^{th}$ up-branch filter signal, represented as $y_{m';u}$. The conjugates of the corresponding up-branch training sequences, multiplied by the multipliers, are represented as $s^*_{m';u,0}, s^*_{m';u,1}, \ldots, s^*_{m';u,D-1}$. In this embodiment, the local training sequence comprises an up-branch training sequence and a down-branch training sequence, wherein the up-branch training sequence corresponds to the above-mentioned up-chirp burst $s_u(t)$, and the down-branch training sequence corresponds to the above-mentioned down-chirp burst $s_d(t)$. wherein the subscript d represents the down-chirp, and the subscript u represents the as up-chirp.

The $(m')^{th}$ down-branch matched filter operating unit (m'th DB MF) has D input terminals, coupled to the receiving buffer 420, for receiving the over-sampling signals $r_{os}[n]$, $r_{os}[n+M_T]$, ..., $r_{os}[n+(D-1)M_T]$, wherein the extracted signals are multiplied by the conjugates of the corresponding down-branch training sequences, respectively, through D multipliers to obtain D down-branch matched operation results represented as $z_{m';d,0}, z_{m';d,1}, \ldots, z_{m';d,D-1}$. All the down-branch matched operation results are synthesized into the $(m')^{th}$ down-branch filter signal represented as $y_{m';d}$. The conjugates of the corresponding down-branch training sequences, multiplied by the multiplier, are represented as $s^*_{m';d,0}, s^*_{m';d,1}, \ldots, s^*_{m';d,D-1}$.

According to the operation of the matched filter operating unit, it is obtained that in the $(m')^{th}$ up-branch matched filter operating unit (m'th UB MF), the sequences of the over-sampling signals are multiplied by the conjugates of the training sequences (up-chirp burst $s_u(t)$). In the down-branch matched filter operating unit (m'th DB MF), the sequences of the over-sampling signals are multiplied by the conjugates of the sequences (down-chirp burst $s_d(t)$). For the continuous time and according to the equation (1), the pulse response of the $(m')^{th}$ up-branch matched filter operating unit (m'th UB MF) and the $(m')^{th}$ down-branch matched filter operating unit (m'th DB MF) may be represented as:

$h_{m';u}(t) =$ $$s_u^*(T - t - m'T_s) = \frac{1}{\sqrt{T}}\exp\left(-j\pi\mu\left(\frac{T}{2} - t - m'T_s\right)^2\right)\Pi\left(\frac{\frac{T}{2} - t - m'T_s}{T}\right),$$

$$h_{m';d}(t) = s_d^*(T - t - m'T_s) = \frac{1}{\sqrt{T}}\exp\left(+j\pi\mu\left(\frac{T}{2} - t - m'T_s\right)^2\right)$$

$$\Pi\left(\frac{\frac{T}{2} - t - m'T_s}{T}\right), m' = 0, 1, \ldots, D-1,$$

wherein $h_{m';u}(t)$ is the pulse response of the $(m')^{th}$ up-branch matched filter operating unit (m'th UB MF), and $h_{m';d}(t)$ is the pulse response of the $(m')^{th}$ down-branch matched filter operating unit (m'th DB MF). For the discrete-time, the above-mentioned pulse responses may be represented as:

$$h_{m';u}[n]=s^*_{m';u}[D-1-n]=s^*_u((|D-1-n-m'|_D+\frac{1}{2})T_s)$$

$$h_{m';d}[n]=s^*_{m';d}[D-1-n]=s^*_d((|D-1-n-m'|_D+\frac{1}{2})T_s) n,$$
$$m'=0,1,\ldots,D-1$$

In the above-mentioned equation, $|x|_D$ represents a remainder obtained after x is divided by D. The $(m')^{th}$ up-branch filter signal obtained by the above-mentioned $(m')^{th}$ up-branch matched filter operating unit (m'th UB MF) may be represented as $y_{m';u}[n]=y_{m';u}((n+\frac{1}{2})T_s)$. The $(m')^{th}$ down-branch filter signal obtained by the $(m')^{th}$ down-branch matched filter operating unit (m'th DB MF) may be represented as $y_{m';d}[n]=y_{m';d}((n+\frac{1}{2})T_s)$.

Figure 7:
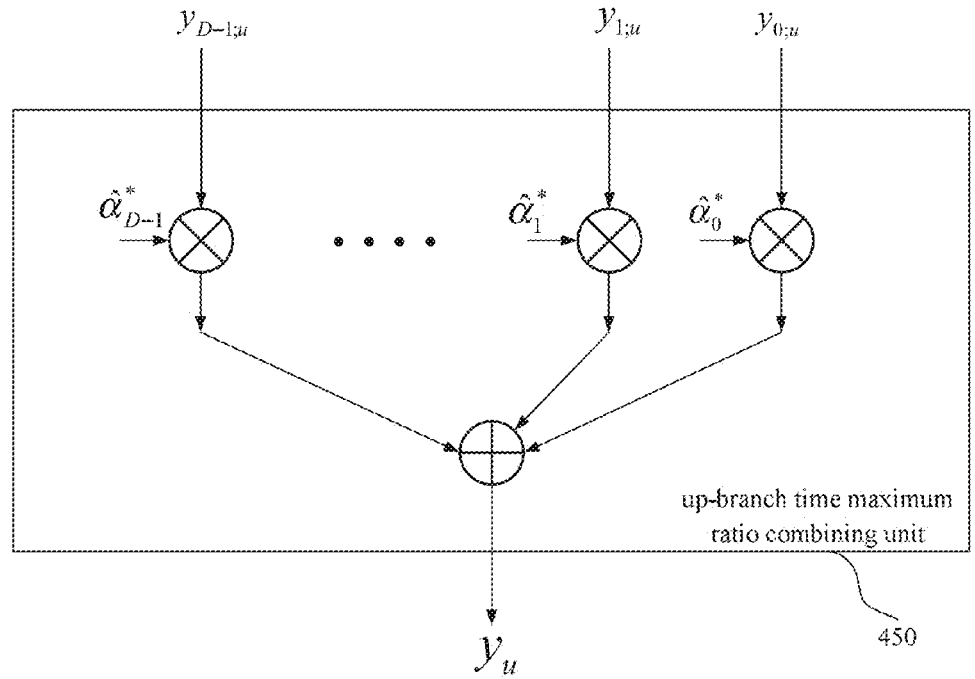
Figure 8:
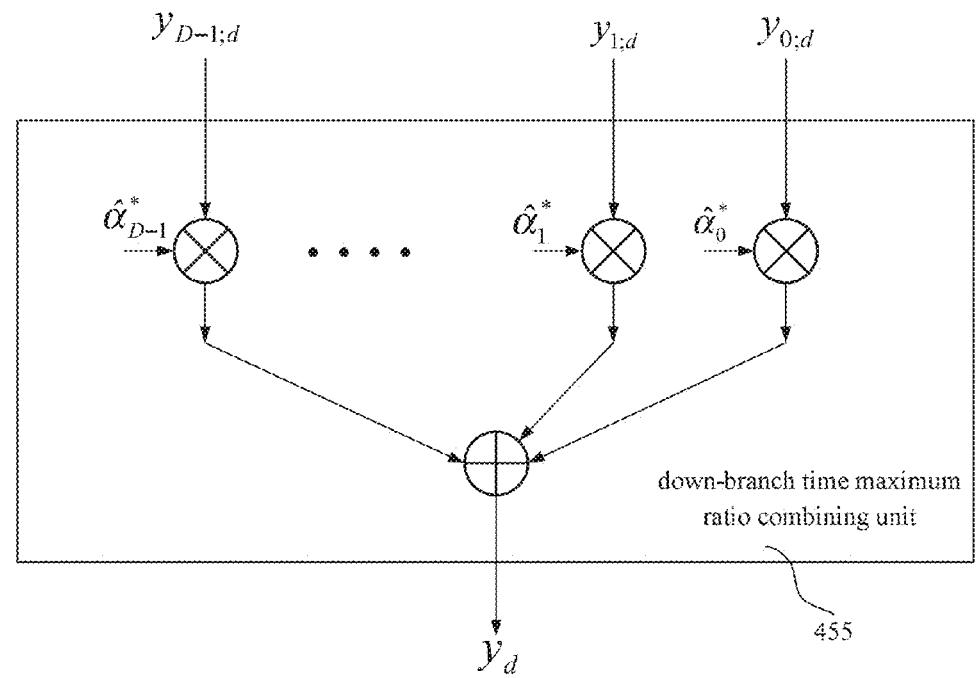

FIG. 7 shows the circuit block in the up-branch time maximum ratio combining unit 450, and FIG. 8 shows the circuit block of the down-branch time maximum ratio combining unit 455. Referring next to FIGS. 7 and 8 and according to the above-mentioned operation, it is obtained that the D up-branch matched filter operating units obtain D up-branch filter signals $y_{0;u}, y_{1;u}, \ldots, y_{D-1;u}$. Next, the up-branch time maximum ratio combining (UB MRC) unit 450 receives D up-branch filter signals $y_{0;u}, y_{1;u}, \ldots, y_{D-1;u}$. In the up-branch time maximum ratio combining unit, the up-branch signals $y_{0;u}, y_{1;u}, \ldots, y_{D-1;u}, \ldots$ are multiplied by the conjugates $\hat{\alpha}^*_0, \hat{\alpha}^*_1, \ldots, \hat{\alpha}^*_{D-1}$ of the channel tap-weighting coefficients obtained by the channel estimation unit 430, respectively, to obtain multiple products. Next, the multiple products are summated into an up-branch time combining signal, represented as $y_u$.

Similarly, the D down-branch matched filter operating units obtain D down-branch filter signals $y_{0;d}, y_{1;d}, \ldots, y_{D-1;d}$ inputted to the down-branch time maximum ratio combining unit 455. In the down-branch time maximum ratio combining unit, the down-branch filter signals $y_{0;d}, y_{1;d}, \ldots, y_{D-1;d}$ are multiplied by the conjugates $\hat{\alpha}^*_0, \hat{\alpha}^*_1, \ldots, \hat{\alpha}^*_{D-1}$ of the channel tap-weighting coefficients obtained by the channel estimation unit 430, respectively, to obtain multiple products. Next, the multiple products are summated into a down-branch time combining signal, represented as $y_d$.

Figure 9:
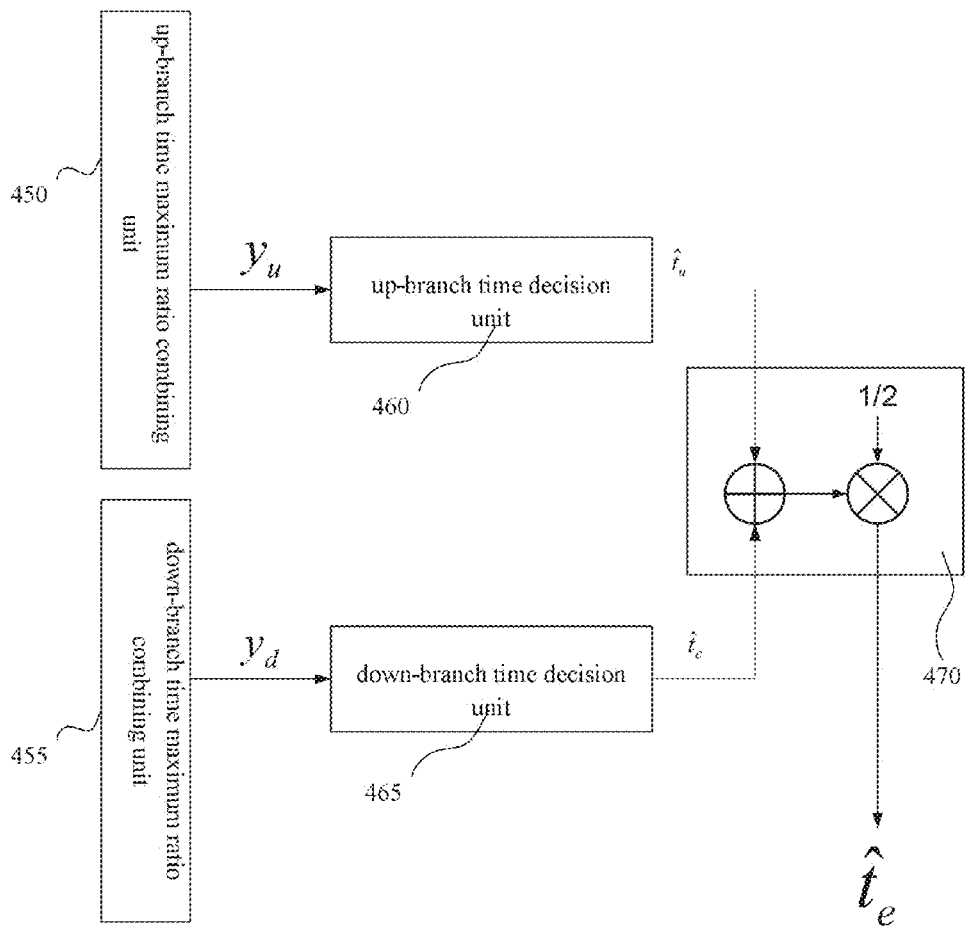

Then, referring to FIG. 9, the up-branch time combining signal $y_u$ will be inputted to an up-branch time decision unit 460. The down-branch time combining signal $y_d$ will be inputted to a down-branch time decision unit 465. The above-mentioned $y_u$ and $y_d$ are obtained after calculating of the over-sampling signals $r_{os}[n], r_{os}[n+M_T], \ldots, r_{os}[n+(D-1)M_T]$ extracted from the receiving buffer 420. In this embodiment, however, in each predetermined time, the over-sampling signals stored in the receiving buffer 420 will be updated. For example, the data of the $M^{th}$ storage unit in the receiving buffer 420 is replaced with the data of the $(M-1)^{th}$ storage unit, the last storage unit stores a newly received over-sampling signal, and the original over-sampling signal stored in the first storage unit before being updated will be discarded.

Thus, in a next predetermined time after the receiving buffer 420 of this embodiment is updated, the signals received by the up-branch matched filter operating units 440-1~440-D and the down-branch matched filter operating units 445-1~445-D are $r_{os}[n+1], r_{os}[n+1+M_T], \ldots, r_{os}[n+1+(D-1)M_T]$, and new up-branch filter signals $y_{0;u}, y_{1;u}, \ldots, y_{D-1;u}$ and new down-branch filter signals $y_{0;d}, u_{1;d}, \ldots, y_{D-1;d}$ are generated. The up-branch time maximum ratio combining unit 450 will generate a new up-branch time combining signal $y_u$, and the down-branch time maximum ratio combining unit 455 will generate a new down-branch time combining signal $y_d$.

Analogically, after multiple predetermined times are experienced, the up-branch time decision unit 460 will collect the up-branch time combining signals $y_u$ corresponding to different time indexes, and the down-branch time decision unit 465 will also collect the down-branch time combining signal $y_d$ corresponding to different time indexes. The up-branch time decision unit 460 finds out a maximum up-branch time combining signal from multiple up-branch time combining signals $y_u$, and extracts its corresponding time index as an up-branch timing error estimation value represented as $\hat{t}_u$. Similarly, the down-branch time decision unit 465 finds out a maximum down-branch time combining signal from multiple down-branch time combining signals $y_d$, and extracts its corresponding time index as a down-branch timing error estimation value represented as $\hat{t}_d$. Finally, the time average circuit 470 calculates an average of the up-branch timing error estimation value $\hat{t}_u$ and the down-branch timing error estimation value $\hat{t}_d$, and outputs the estimated timing error $\hat{t}_e$ of this embodiment, wherein the value thereof is represented as $(\hat{t}_u + \hat{t}_d)/2$.

According to the above-mentioned timing error estimation operations, it is obtained that the embodiment of the present invention utilizes the multiple time combining signals $y_u$ and $y_d$ to respectively find out the maximum values thereof to decide the timing error. For the above-mentioned $y_u$ and $y_d$, the correlations between the training sequences at different times are found through the matched filters. In addition, this embodiment further utilizes the channel tap-weighting coefficient on each path to perform the maximum ratio combination on the correlations calculated by the matched filters, and then decides their maximum values. In other words, the embodiment of the present invention in the rake architecture utilizes the diversity combination to achieve the more precise timing error estimation.

The initial synchronization apparatus provided by the embodiment of the present invention may also be used to estimate the CFO without performing the calculation on the received signals again. The embodiment of the present invention can utilize the above-mentioned up-branch matched filter operating unit and the down-branch matched filter operating unit to obtain the intermediate product of the matched filtering operation to perform the CFO estimation. Referring back to FIG. 6 and according to the operation of the above-mentioned $(m')^{th}$ up-branch matched filter operating unit (m'th UB MF), it is obtained that the multipliers obtain multiple up-branch matched operation results $z_{m';u,0}, z_{m';u,1}, \ldots, z_{m';u,D-1}$. Similarly, according to the operation of the above-mentioned $(m')^{th}$ down-branch matched filter operating unit (m'th DB MF), it is obtained that the multipliers obtain multiple down-branch matched operation results $z_{m';d,0}, z_{m';d,1}, \ldots, z_{m';d,D-1}$.

Figure 10:
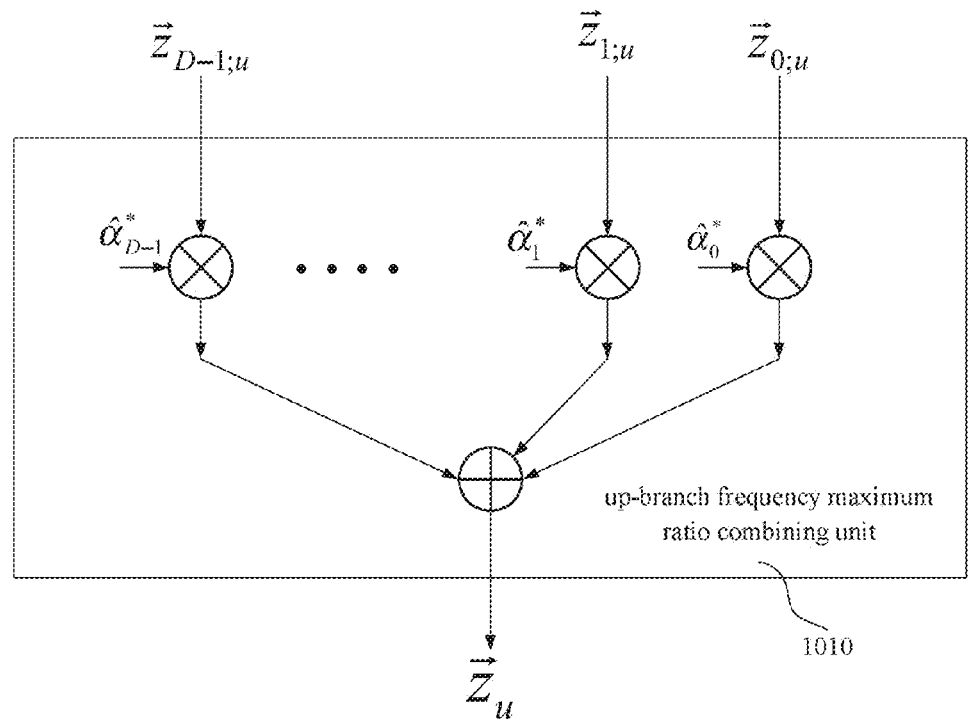
FIGS. 10 to 12 are schematic system block diagrams showing frequency offset estimation portions in the initial synchronization apparatus according to an embodiment of the present invention.
Figure 11:
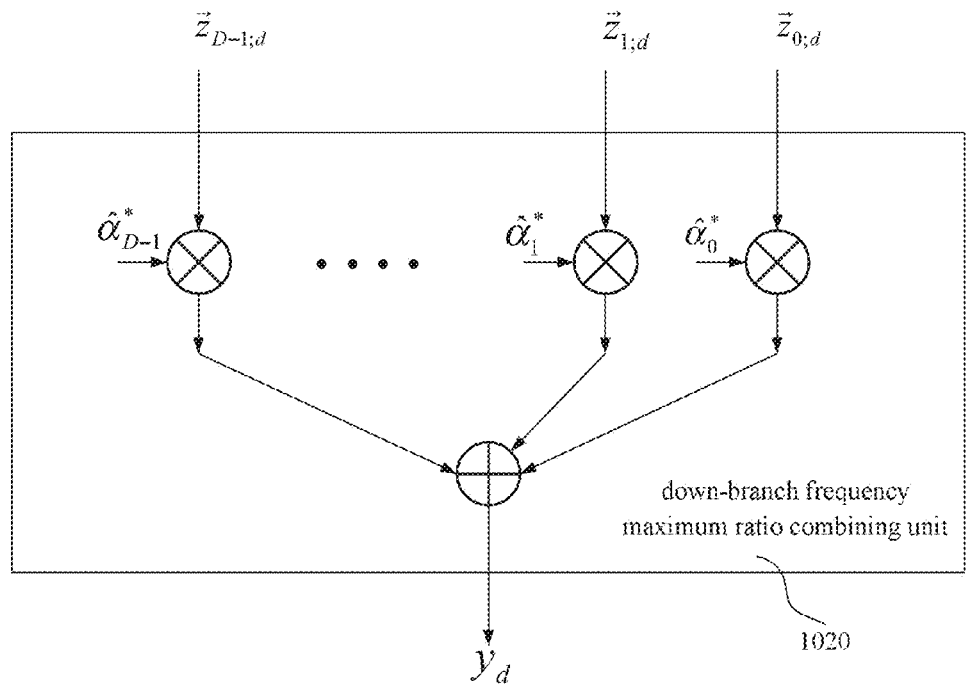

FIGS. 10 and 11 are schematic system block diagrams showing frequency offset estimation portions in the initial synchronization apparatus according to an embodiment of the present invention. Referring first to FIG. 10, the up-branch frequency maximum ratio combining unit 1010 has D input terminals for receiving up-branch matched operation results generated by D up-branch matched filter operating units 440-1~440-D. The up-branch matched operation results generated by the up-branch matched filter operating units 440-1~440-D can constitute a first vector. Taking the $(m')^{th}$ up-branch matched filter operating unit (m'th UB MF) as an example, the first vector may be represented as $\vec{z}_{m';u} = [z_{m';u,0}\ z_{m';u,1}\ \ldots\ z_{m';u,D-1}]^T$. The D up-branch matched filter operating units 440-1~440-D will obtain D first vectors $\vec{z}_{0;u}, \vec{z}_{1;u}, \ldots, \vec{z}_{D-1;u}$. In the up-branch frequency maximum ratio combining unit 1010, the D first vectors $\vec{z}_{0;u}, \vec{z}_{1;u}, \ldots, \vec{z}_{D-1;u}$ are multiplied by the conjugates $\hat{\alpha}^*_0, \hat{\alpha}^*_1, \ldots, \hat{\alpha}^*_{D-1}$ of the channel tap-weighting coefficient obtained by the channel estimation unit 430, respectively, to obtain multiple products. Next, the multiple products are summated into an up-branch frequency domain combining vector represented as $\vec{z}_u$. The vector length of $\vec{z}_u$ is D, and the equation of $\vec{z}_u$ may be represented as $\vec{z}_u = \hat{\alpha}^*_0 \cdot \vec{z}_{0;u} + \hat{\alpha}^*_1 \cdot \vec{z}_{1;u} + \ldots + \hat{\alpha}^*_{D-1} \cdot \vec{z}_{D-1;u}$.

Referring to FIG. 11, the down-branch frequency maximum ratio combining unit 1020 has D input terminals for receiving the down-branch matched operation results generated by the D down-branch matched filter operating units 445-1~445-D, respectively. The down-branch matched operation results generated by the down-branch matched filter operating units 445-1~445-D can constitute a second vector. Taking the $(m')^{th}$ down-branch matched filter operating unit (m'th DB MF) as an example, the second vector may be represented as $\vec{z}_{m';d} = [z_{m';d,0}\ z_{m';d,1}\ \ldots\ z_{m';d,D-1}]^T$. The D down-branch matched filter operating units 445-1~445-D will obtain D second vectors $\vec{z}_{0;d}, \vec{z}_{1;d}, \ldots, \vec{z}_{D-1;d}$. In the down-branch frequency maximum ratio combining unit 1020, the D second vectors $\vec{z}_{0;d}, \vec{z}_{1;d}, \ldots, \vec{z}_{D-1;d}$ are multiplied by the conjugates $\hat{\alpha}^*_0, \hat{\alpha}^*_1, \ldots, \hat{\alpha}^*_{D-1}$ of the channel tap-weighting coefficients obtained by the channel estimation unit 430, respectively, to obtain multiple products. Next, the multiple products are summated into a down-branch frequency domain combining vector represented as $\vec{z}_d$. The vector length of $\vec{z}_d$ is D, and the equation of $\vec{z}_d$ may be represented as $\vec{z}_d = \hat{\alpha}^*_0 \cdot \vec{z}_{0;d} + \hat{\alpha}^*_1 \cdot \vec{z}_{1;d} + \ldots + \hat{\alpha}^*_{D-1} \cdot \vec{z}_{D-1;d}$.

Figure 12:
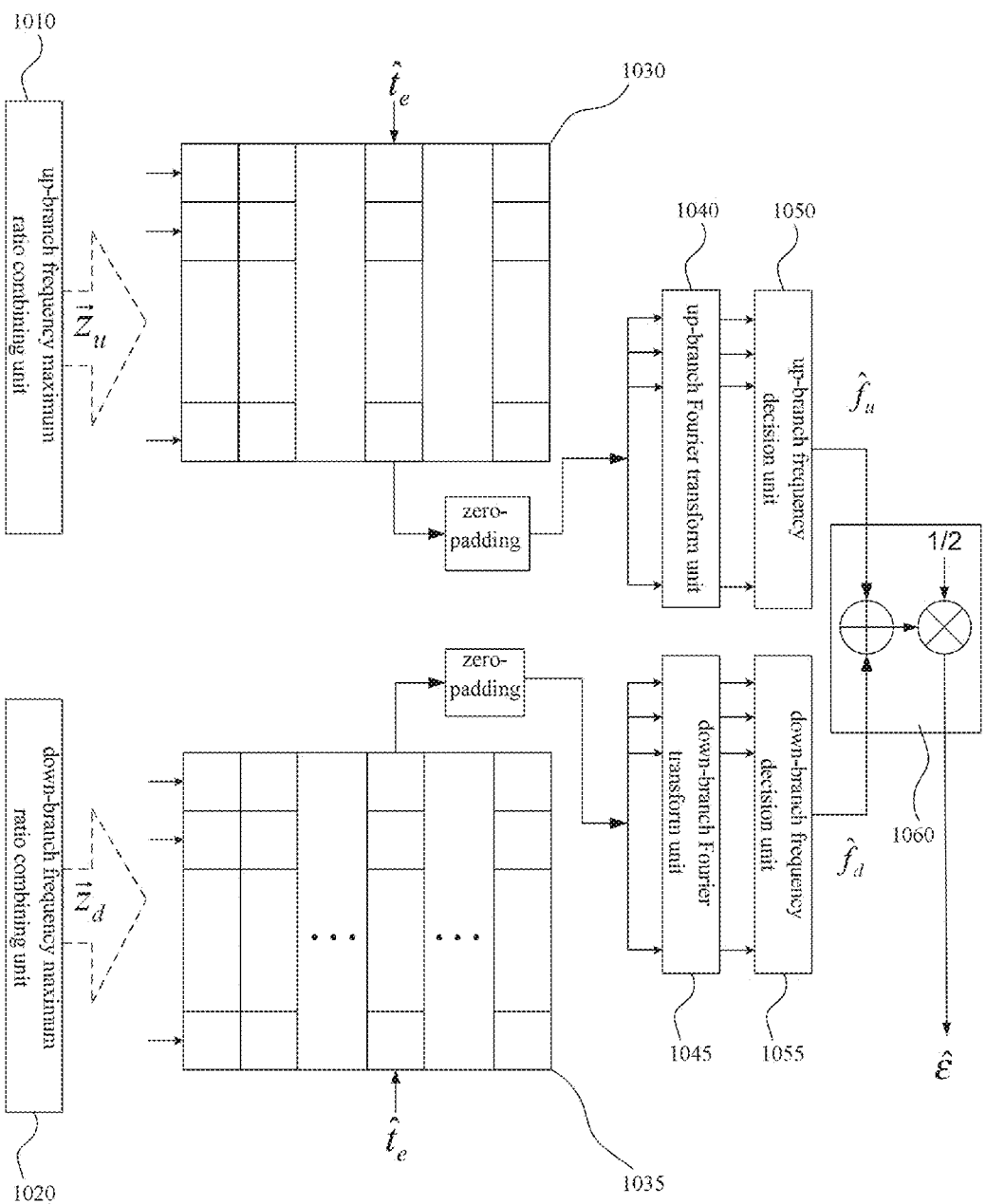

Referring next to FIG. 12, the up-branch frequency domain combining sequence $\vec{z}_u$ will be placed into an up-branch array temporarily storing circuit 1030. For the sake of the illustration of the embodiment of the present invention, the up-branch array temporarily storing circuit 1030 in FIG. 12 is depicted as a matrix form. The up-branch frequency domain combining vector $\vec{z}_u$ outputted from the up-branch frequency maximum ratio combining unit 1010 is placed into the first column of the up-branch array temporarily storing circuit 1030, for example. Similarly, the down-branch frequency domain combining vector $\vec{z}_d$ outputted from the down-branch frequency maximum ratio combining unit 1020 is placed into the first column of the down-branch array temporarily storing circuit 1035, for example.

Like the description of the above-mentioned estimation time error estimating portion, the over-sampling signal $r_{os}[n]$ temporarily stored in the receiving buffer 220 will be updated at each predetermined time in this embodiment. Thus, the up-branch matched filter operating units 440-1~440-D and the down-branch matched filter operating units 445-1~445-D will generate new vectors $\vec{z}_{0;u}, \vec{z}_{1;u}, \ldots, \vec{z}_{D-1;u}$ and $\vec{z}_{0;d}, \vec{z}_{1;d}, \ldots, \vec{z}_{D-1;d}$, respectively. The up-branch frequency maximum ratio combining unit 1010 and the down-branch frequency maximum ratio combining unit 1020 will also calculate the new frequency combining vectors $\vec{z}_u$ and $\vec{z}_d$.

The updated up-branch frequency combining vector $\vec{z}_u$ will be continuously placed into the second column in the up-branch array temporarily storing circuit 1030. Herein, the up-branch array temporarily storing circuit 1030 is a shift register, for example. Thus, after the updated up-branch frequency combining vector $\vec{z}_u$ is stored into the up-branch array temporarily storing circuit 1030, the data originally stored into the first column of the up-branch array temporarily storing circuit 1030 (i.e., the up-branch frequency combining vector $\vec{z}_u$ obtained in the previous predetermined time observation time) will be shifted rightwards to the second column in the up-branch array temporarily storing circuit 1030. Similarly, the down-branch array temporarily storing circuit 1035 is also a shift register, for example. After the updated down-branch frequency combining vector $\vec{z}_d$ is stored into the first column in the down-branch array temporarily storing circuit 1035, the data originally stored into the first column in the down-branch array temporarily storing circuit 1035 (i.e., the down-branch frequency combining vector $\vec{z}_u$ obtained in the previous predetermined time observation time) will be shifted rightwards to the second column in the down-branch array temporarily storing circuit 1035. Analogically, each column of the up-branch array temporarily storing circuit 1030 and each column of the down-branch array temporarily storing circuit 1035 will be sequentially stored into the up-branch frequency combining vector $\vec{z}_u$ and the down-branch frequency combining vector $\vec{z}_d$ corresponding to different time indexes.

The up-branch Fourier transform unit 1040 extracts the column vector, corresponding to $\hat{t}_e$, from the up-branch array temporarily storing circuit 1030 (i.e., extracts the specific up-branch frequency combining vector $\vec{z}_u$ corresponding to the time index represented by $\hat{t}_e$) according to the timing error estimation value $\hat{t}_e$ calculated by the time average circuit 470. The up-branch Fourier transform unit 1040 performs the Fourier transform on the specific up-branch frequency combining vector $\vec{z}_u$ to obtain multiple up-branch frequency domain transform signals. Next, the up-branch frequency decision unit 1050 finds out the maximum up-branch frequency domain transform signal from the multiple up-branch frequency domain transform signals, and extracts the frequency index corresponding to the maximum up-branch frequency domain transform signal as an up-branch frequency offset estimation value represented as $\hat{f}_u$.

Similarly, the down-branch Fourier transform unit 1045 extracts the column vector, corresponding to $\hat{t}_e$, from the down-branch array temporarily storing circuit 1035 (i.e., extracts the specific down-branch frequency combining vector $\vec{z}_d$ corresponding to the time index represented by $\hat{t}_e$) according to the timing error estimation value $\hat{t}_e$ calculated by the time average circuit 470. The down-branch Fourier transform unit 1045 performs the Fourier transform on the specific down-branch frequency combining vector $\vec{z}_d$ to obtain multiple down-branch frequency domain transform signals. Next, the down-branch frequency decision unit 1055 finds out the maximum down-branch frequency domain transform signal from multiple down-branch frequency domain transform signals, and extracts the maximum frequency index corresponding to the down-branch frequency domain transform signal as a down-branch frequency offset estimation value represented as $\hat{f}_d$. Finally, the frequency average circuit 1060 calculates an average of $\hat{f}_u$ and $\hat{f}_d$ to obtain an estimation value $\hat{\epsilon}$ of CFO having the value of $(\hat{f}_u+\hat{f}_d)/2$.

The above-mentioned up-branch Fourier transform unit 1040 and the down-branch Fourier transform unit 1045 are implemented using the fast Fourier transform, for example. In this embodiment, a zero-padding unit may also be coupled between the up-branch Fourier transform unit 1040 and the up-branch array temporarily storing circuit 1030 to perform the zero-padding operation on the column vector extracted from the up-branch array temporarily storing circuit 1030, and then perform the Fourier transform. Similarly, in this embodiment, a zero-padding unit may also be coupled between the down-branch Fourier transform unit 1045 and the down-branch array temporarily storing circuit 1035 to perform the zero-padding operation on the column vector extracted from the down-branch array temporarily storing circuit 1035, and then perform the Fourier transform. The above-mentioned zero-padding operation can enhance the estimated frequency domain precision, and further pad the extracted column vector to the length of the power of 2, and then perform the fast Fourier transform.

According to the above-mentioned frequency offset estimation operation, it is obtained that the frequency combining vectors $\vec{z}_u$ and $\vec{z}_d$ are equivalent to the product sequences obtained after the received signals are multiplied by the corresponding training sequences, and the product sequences, obtained after the Fourier transform is performed, are equivalent the convolution operation (i.e., the correlation operation or the matched filtering operation is performed). The above-mentioned frequency decision unit is equivalent to the found correlation maximum, that is, the frequency correction value required upon frequency alignment.

In the up-branch and down-branch array temporarily storing circuits 1030 and 1035, the sum of the column vector corresponding to the extract timing error $\hat{t}_e$ are the maximum time combining signals $y_u$ and $y_d$. The above-mentioned extraction of the column vector corresponding to the timing error $\hat{t}_e$ is equivalent to finding out the vectors $\vec{z}_u$ and $\vec{z}_d$ with the minimum time errors.

For the dual-chirp burst, after the up-chirp and down-chirp are transferred through the channel, they only has a little drift on the time domain. However, because the up-chirp and the down-chirp have the reverse time errors, the central value obtained after the averaging is performed has no timing error. This embodiment utilizes the timing error estimation values $\hat{t}_u$ and $\hat{t}_d$ of the up-chirp and the down-chirp separately calculated by the up-branch and the down-branch, and then takes an average thereof to obtain a timing error central value $\hat{t}_e$. Thus, this embodiment performs the precise frequency offset estimation when the timing errors are aligned (i.e., no timing error is present).

In the above-mentioned embodiment, each of the up-branch and down-branch array temporarily storing circuits 1030 and 1035 is a register with a matrix arrangement pattern, for example. However, those skilled in the art should know that any memory can be applied to the present invention as long as the memory can store the frequency combining vectors $\vec{z}_u$ and $\vec{z}_d$ corresponding to different time indexes. Thus, the present invention does not restrict the aspect of the array temporarily storing circuit.

Figure 13:
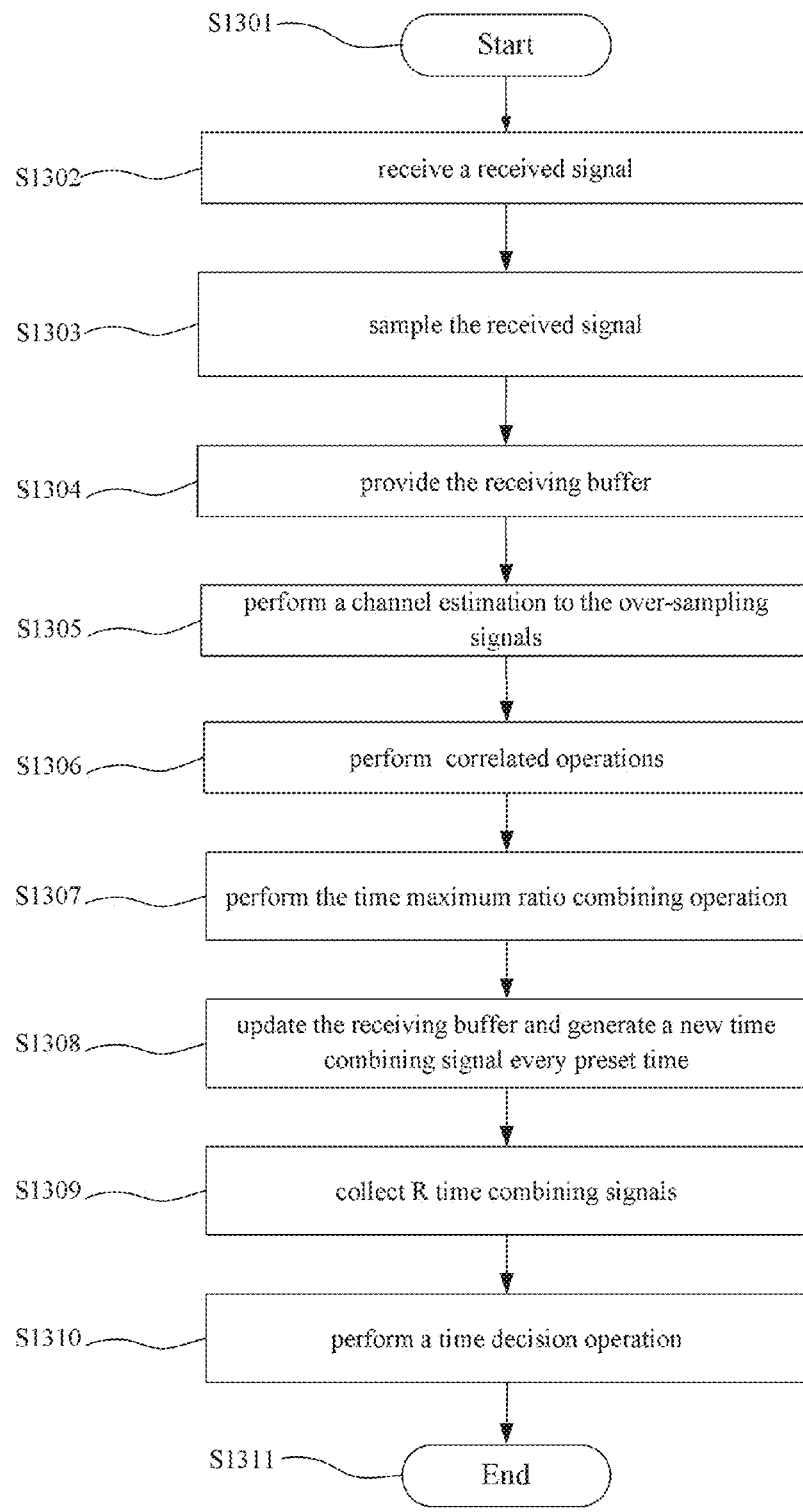
FIG. 13 is a flowchart showing the initial synchronization method according to an embodiment of the present invention.

According to the abovementioned operation of the initial synchronization apparatus, a initial synchronization method can be summarized. FIG. 13 is the flowchart showing the initial synchronization method according to a preferred embodiment of the present invention. Referring to FIG. 13, the method comprising the steps as follow.

In step S1301, the initial synchronization method starts.

In step S1302, a received signal is received, wherein the received signal includes a training sequence transmitted from the transmitter. As the description of the operation corresponding to FIG. 4, when the receiver receives the high frequency signal, the received signal is obtained through the down-conversion and filter, wherein the receiving signal is represented as r(t+T).

In step S1303, the received signal is sampled to obtain N over-sampling signals. As the description of the over-sampling unit 410 in FIG. 4, after the received signal is sampled, the over-sampling signals are obtained, wherein the over-sampling signals are represented as $r_{os}[n]$, wherein the sampling frequency is designed as $M_T/T_s$.

In step S1304, the receiving buffer is provided. The receiving buffer includes N storage units for storing $0^{th}$ to $N-1^{th}$ over-sampling signals. As the description of the receiving buffer 420 in FIG. 4, the over-sampling signals $r_{os}[n]$ are sequentially stored into the receiving buffer 420.

In step S1305, a channel estimation to the over-sampling signals $r_{os}[n]$ is performed according to the local training sequence, to obtain D channel tap-weighting coefficient. As the description of the channel estimation unit 430 in FIG. 4, a plurality of multipliers and a plurality of digital low pass filters are utilized to extract a plurality of channel tap-weighting coefficients $\hat{\alpha}_0, \hat{\alpha}_1, \ldots, \hat{\alpha}_{D-1}$. Moreover, the channel estimation unit 430 in the present embodiment extracts the plurality of channel tap-weighting coefficients $\hat{\alpha}_0, \hat{\alpha}_1, \ldots, \hat{\alpha}_{D-1}$ through the multipliers and the digital low pass filters, people having ordinary skill in the art should know that the any channel estimation technology for acquiring the channel tap-weighting coefficients can be adopted in the present invention. Thus, the present invention is not limited thereto.

In the step S1306, D correlated operations are performed to obtain D filter signals, wherein $m^{\prime th}$ correlated operation is shown as the operation of the $m^{\prime th}$ up-branch match filter operating units in FIG. 6, for example. According to the description corresponding to FIG. 5 and FIG. 6, the calculation of the correlation in the present embodiment uses a plurality of up-branch matched filter operating units and a plurality of down-branch matched filter operating units. However, people having ordinary skill in the art should know that the designer may only implement one of the plurality of up-branch matched filter operating units and the plurality of down-branch matched filter operating units. Further, the designer may change the number of the matched filter operating units according to the practical application, such as channel situation, the form of the training sequence, the complex of the hardware and so on.

In step S1307, the time maximum ratio combining operation is performed. The time combining signal is generated through the time maximum ratio combining operation. The time maximum ratio combining operation may be referred to the operation of the up-branch time maximum ratio combining unit 450 in FIG. 7. According to the description corresponding to FIG. 7 and FIG. 8, the time maximum ratio combining operation in the present embodiment uses the up-branch time maximum ratio combining operation and the down-branch time maximum ratio combining operation. However, people having ordinary skill in the art should know that the designer can select one of the up-branch time maximum ratio combining operation and the down-branch time maximum ratio combining operation according to the practical application, such as channel situation, the form of the training sequence, the complex of the hardware and so on.

In step S1308, the receiving buffer is updated every preset time, and a new time combining signal is generated every preset time. In the present embodiment, the receiving buffer may be a shift register. When a new over-sampling signal is inputted into the receiving buffer, each data stored in the storage unit of the receiving buffer would be shifted rightwards. And the data stored in the most right storage unit would be abandoned. Taking the embodiment in FIG. 4 as an example, in the next preset time, the new over-sampling signal is $r_{os}[n+N]$, and the abandoned over-sampling signal is $r_{os}[n]$. When the receiving buffer is updated, the steps S1305 to S1307 are repeated to generate new time combining signal.

In step S1309, R time combining signals is collected.

In step S1310, a time decision operation is performed. As the operation shown in FIG. 9, the maximum time combining signal is acquired from the plurality of time combining signals, and the time index of the maximum time combining signal is also acquired to serve as a timing error estimation value. In FIG. 9, the up-branch time decision unit and the down-branch time decision unit are used in the embodiment. And the time average circuit 470 is used to obtain the average value to serve as the timing error estimation value. However, people having ordinary skill in the art should know that the designer may only implement one of the up-branch time decision unit and the down-branch time decision unit according to the practical application, such as channel situation, the form of the training sequence, the complex of the hardware and so on.

In step S1311, the initial synchronization method ends.

Figure 14:
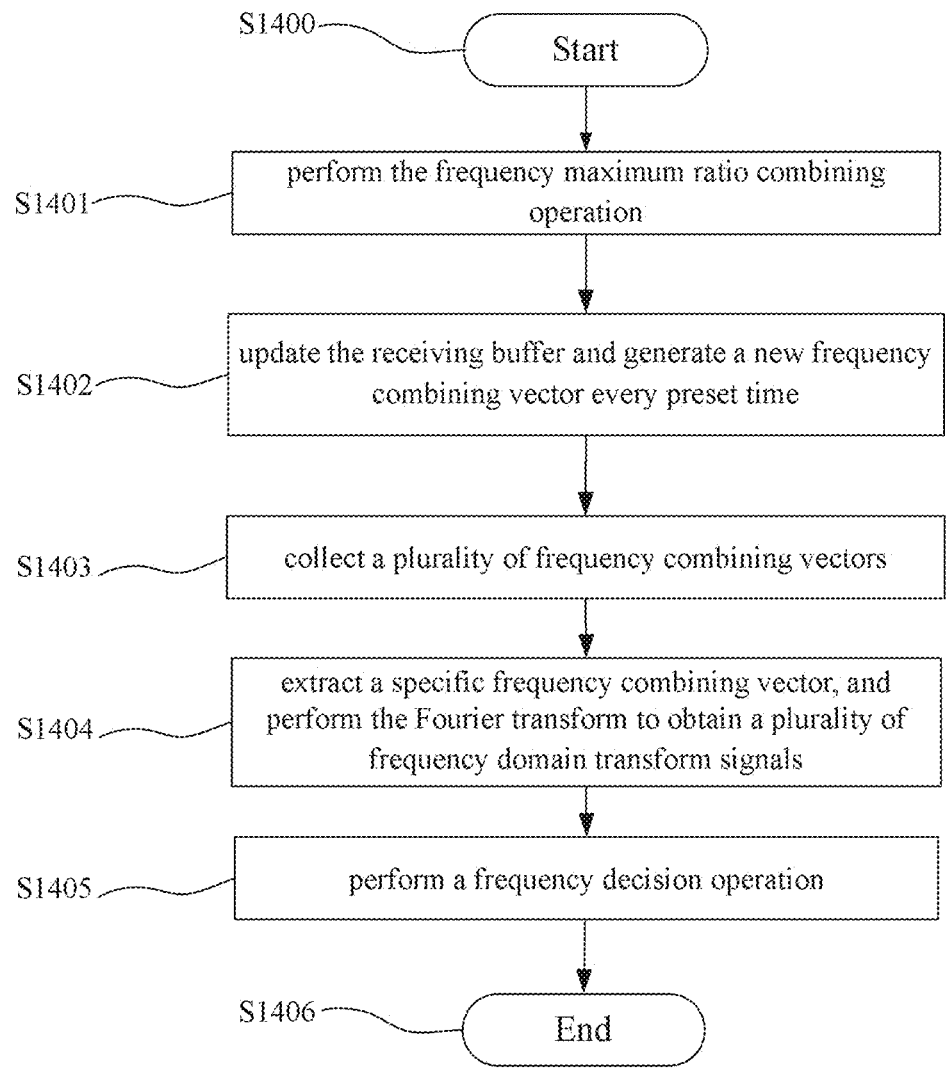
FIG. 14 is a flowchart showing the initial synchronization method according to an embodiment of the present invention.

In the present embodiment, the initial synchronization method only estimates the timing error. In order to obtain the more precise synchronization information, the following embodiment describes how to estimate the frequency offset. FIG. 14 is a flowchart showing the initial synchronization method according to an embodiment of the present invention. Referring to FIG. 14, the initial synchronization method includes the steps as follow.

In step S1400, the initial synchronization method starts.

In step S1401, the frequency maximum ratio combining operation is performed. The step S1401 is as the operation of the up-branch frequency maximum ratio combining unit 1010 in FIG. 10, which obtains the up-branch frequency combining vector. According to the FIG. 10 and FIG. 11, the embodiment uses the up-branch frequency maximum ratio combining unit 1010 and the down-branch frequency maximum ratio combining unit 1020. However, people having ordinary skill in the art should know that the designer may only implement one of the up-branch frequency maximum ratio combining unit 1010 and the down-branch frequency maximum ratio combining unit 1020 according to the practical application, such as channel situation, the form of the training sequence, the complex of the hardware and so on.

In step S1402, the receiving buffer is updated and a new frequency combining vector is generated every preset time. In the present embodiment, the receiving buffer may be the shift register. When a new over-sampling signal is inputted into the receiving buffer, the data stored in the storage unit of the receiving buffer would be shifted rightwards, and the signal stored in the most right side storage unit would be abandoned.

Taking FIG. 4 as an example, at the next preset time, the new over-sampling signal would be $r_{os}[n+N]$, and the abandoned over-sampling signal would be $r_{os}[n]$. After the receiving buffer is updated, the step S1401 is repeated to generate a new frequency combining vector.

In step S1403, a plurality of frequency combining vectors is collected. As shown in the abovementioned up-branch and down-branch array temporarily storing circuits 1030 and 1035, the up-branch frequency combining vector $\vec{z}_u$ and the down-branch frequency combining vector $\vec{z}_d$ is sequentially stored every preset time.

In step S1404, according to the time error estimation value, a specific frequency combining vector is extracted from the plurality of frequency combining vectors, and the Fourier transform is performed to the specific frequency combining vector to obtain a plurality of frequency domain transform signals. The step S1404 is operated as the operation of the up-branch Fourier transform unit 1040. And after the specific frequency combining vector is extracted, the zero padding can be performed to upgrade the precise of the operation of the frequency domain.

In step S1405, a frequency decision operation is performed, wherein a maximum value estimation is performed to the plurality of frequency domain transform signals to obtain the maximum frequency domain transform signal. Thus, the frequency index corresponding to the maximum frequency domain transform signal is acquired to serve as the frequency offset estimation value. The step S1405 is as the operation of the up-branch frequency decision unit 1050 in FIG. 12.

In the embodiment of FIG. 12, the operation includes the up-branch and the down-branch. However, people having ordinary skill in the art should know that the designer can only implement the up-branch array temporarily storing circuits 1030, the up-branch Fourier transform unit 1040 and the up-branch frequency decision unit 1050 according to the practical application, such as channel situation, the form of the training sequence, the complex of the hardware and so on. In the embodiment in FIG. 12, the up-branch frequency decision unit 1050 and the down-branch frequency decision unit 1055 generate frequency offset estimation values, which respectively are $\hat{f}_u$ and $\hat{f}_d$. In the present embodiment, the frequency decision operation in the step S1405 may further includes averaging the frequency offset estimation values $\hat{f}_u$ and $\hat{f}_d$, and taking the average value thereof to serve as the frequency offset estimation value.

In step S1406, the initial synchronization method ends.

In summary, the present invention has at least the following advantages.

First, it is obtained, from the above-mentioned timing error estimation operation, that the embodiment of the present invention utilizes the multiple time combining signals $y_u$ and $y_d$ to find out the maximum to decide the timing error. For the above-mentioned $y_u$ and $y_d$, the correlations between the training sequences at different times are found through the matched filters. In addition, this embodiment further utilizes the channel tap-weighting coefficient on each path to perform maximum ratio combining on the correlations calculated by the matched filters, and then decides as having the maximum. In other words, the embodiment of the present invention in the rake architecture utilizes the diversity combination to achieve the more precise timing error estimation.

Second, when the embodiment of the present invention estimates the frequency offset, multiple products in the matched filter operating unit are utilized. In other words, the intermediate product generated when the timing error estimation is performed is utilized, so that the calculating loading of estimating the frequency offset is reduced.

The embodiment of the present invention utilizes the timing error estimation value to find out the product sequence having the maximum time correlation when the timing alignment is present, and then performs the frequency offset estimation. In other words, the embodiment of the present invention can perform the precise frequency offset estimation in the condition without the timing error.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. An initial synchronization apparatus for receiving a received signal comprising a training sequence, the initial synchronization apparatus comprising:
   an over-sampling unit, sampling the received signal to obtain N over-sampling signals;
   a receiving buffer, which is coupled to the over-sampling unit, has N storage units, and stores the $0^{th}$~$(N-1)^{th}$ over-sampling signals;
   a channel estimation unit, which is coupled to the receiving buffer and performs a channel estimation on the over-sampling signals according to a local training sequence to obtain D channel tap-weighting coefficients, wherein the local training sequence comprises D discrete training signals represented as $s[0], s[1], \ldots, s[D-1]$;
   D matched filter operating units, each matched filter operating unit having D input terminals, wherein the $J^{th}$ input terminal of each of the matched filter operating units receives the over-sampling signal of the $(M_T \times J)^{th}$ receiving buffer, wherein a matched filtering operation is performed on the over-sampling signal of the $K^{th}$ input terminal of the $(m')^{th}$ matched filter operating unit and a conjugate of the discrete training signal $s[MOD(K-m')]$ to obtain a $K^{th}$ matched operation result, wherein the $(m')^{th}$ matched filter operating unit combines all the matched operation results into a $(m')^{th}$ filter signal, where $MOD(x)$ represents a remainder obtained after x is divided by D;
   a time maximum ratio combining unit, which is coupled to the D matched filter operating units and the channel estimation unit, and performs a weight-product operation on the $I^{th}$ filter signal and a conjugate of the $I^{th}$ channel tap-weighting coefficient to obtain an $I^{th}$ time tap-weighting coefficient result, wherein the time maximum ratio combining unit combines all the time tap-weighting coefficient results into a time combining signal,
   wherein every predetermined time, the receiving buffer replaces data of the $M^{th}$ storage unit with data of the $(M-1)^{th}$ storage unit, and updates the first storage unit, and every predetermined time, a new time combining signal is generated, wherein the $Q^{th}$ time combining signal is generated in the $Q^{th}$ predetermined time; and
   a time decision unit, which is coupled to the time maximum ratio combining unit, collects R time combining signals, performs a maximum estimation on the R time combining signals, finds out a maximum time combining signal, and extracts a time index corresponding to the maximum time combining signal as a timing error estimation value;
   where D, N, and $M_T$ are positive integers, $N \geq M_T \times D$, J, K, m', I are integers ranging from 0 to D−1, M is a positive integer, $2 \leq M \leq N$, R is a positive integer, and Q is a real number.

2. The initial synchronization apparatus according to claim 1, wherein the local training sequence comprises an up-branch training sequence and a down-branch training sequence, the D matched filter operating units are D up-branch matched filter operating units, the time maximum ratio combining unit is an up-branch time maximum ratio combining unit, and the time decision unit is an up-branch time decision unit, wherein the down-branch training sequence comprises D down-branch discrete training signals, represented as $s_d[0], s_d[1], \ldots, s_d[D-1]$, and the initial synchronization apparatus further comprises:
   D down-branch matched filter operating units each having D input terminals, wherein the $J^{th}$ input terminal of each of the down-branch matched filter operating units receives the over-sampling signal of the $(M_T \times J)^{th}$ receiving buffers, wherein the matched filtering operation is performed on the over-sampling signal of the $K^{th}$ input terminal of the $(m')^{th}$ down-branch matched filter operating unit and the conjugate of the down-branch discrete training signal $s_d[MOD(K-m')]$ to obtain a $K^{th}$ down-branch matched operation result, wherein the $(m')^{th}$ down-branch matched filter operating unit combines all the down-branch matched operation results into a $(m')^{th}$ down-branch filter signal;
   a down-branch time maximum ratio combining unit, which is coupled to the D down-branch matched filter operating units and the channel estimation unit, and performs a weight-product operation on the $I^{th}$ down-branch filter signal and the conjugate of the $I^{th}$ channel tap-weighting coefficient to obtain an $I^{th}$ down-branch time tap-weighting coefficient result, wherein the down-branch time maximum ratio combining unit combines all the down-branch time tap-weighting coefficient results into a down-branch time combining signal,
   wherein every predetermined time, the receiving buffer replaces the data of the $M^{th}$ storage unit with the data of the $(M-1)^{th}$ storage unit, and updates the first storage unit, and every predetermined time, a new down-branch time combining signal is generated, wherein the $Q^{th}$ down-branch time combining signal is generated in the $Q^{th}$ predetermined time;
   a down-branch time decision unit, which is coupled to the down-branch time maximum ratio combining unit, collects R down-branch time combining signals, performs a maximum estimation on the R down-branch time combining signals, finds out a maximum down-branch time combining signal, and extracts the time index, corresponding to the maximum down-branch time combining signal, as a down-branch timing error estimation value; and
   a time average circuit, which is coupled to the up-branch time decision unit and the down-branch time decision unit, receives the timing error estimation value and the down-branch timing error estimation value, and performs an average operation to obtain an average timing error as the timing error estimation value.

3. The initial synchronization apparatus according to claim 1, further comprising:
   a frequency maximum ratio combining unit, which is coupled to the D matched filter operating units and the channel estimation unit, and performs an weight product a weight-product operation on each of the matched operation results of the $P^{th}$ matched filter operating unit and a conjugate of the corresponding channel tap-weighting coefficient, wherein the weight-product operation is performed on the $U^{th}$ matched operation result of the $P^{th}$ matched filter operating unit and a conjugate of the $U^{th}$ channel tap-weighting coefficient to obtain the $U^{th}$ frequency tap-weighting coefficient result, wherein the frequency maximum ratio combining unit combines all the frequency tap-weighting coefficient results into a frequency combining vector, and the frequency combining vector comprises D frequency combining signals, wherein the $V^{th}$ frequency combining signal is a sum of the $V^{th}$ frequency tap-weighting coefficient results corresponding to all the matched filter operating units, wherein every predetermined time, the receiving buffer replaces the data of the $M^{th}$ storage unit with the data of the $(M-1)^{th}$ storage unit, and updates the first storage unit, and every predetermined time, the frequency maximum ratio combining unit generates a new frequency combining vector, wherein the frequency maximum ratio combining unit generates the $Q^{th}$ frequency combining vector in the $Q^{th}$ predetermined time;

an array temporarily storing circuit, which is coupled to the frequency maximum ratio combining unit and stores R frequency combining vectors;

a Fourier transform unit, which is coupled to the array temporarily storing circuit, extracts a specific frequency combining vector from the array temporarily storing circuit according to the timing error estimation value, and performs a Fourier transform to obtain multiple frequency domain transform signals; and a frequency decision unit, which is coupled to the Fourier transform unit, receives the multiple frequency domain transform signals, performs a maximum estimation on the multiple frequency domain transform signals, finds out a maximum frequency domain transform signal, and extracts a frequency index, corresponding to the maximum frequency domain transform signal, as a frequency offset estimation value;

where P, U and V are integers ranging from 0 to D−1.

4. The initial synchronization apparatus according to claim 3, wherein the local training sequence comprises an up-branch training sequence and a down-branch training sequence, the D matched filter operating units are D up-branch matched filter operating units, the time maximum ratio combining unit is an up-branch time maximum ratio combining unit, and the time decision unit is an up-branch time decision unit, wherein the down-branch training sequence comprises D down-branch discrete training signals represented as $s_d[0]$, $s_d[1]$, . . . , $s_d[D−1]$, and the initial synchronization apparatus further comprises:

D down-branch matched filter operating units each having D input terminals, wherein the $J^{th}$ input terminal of each of the down-branch matched filter operating units receives the over-sampling signal of the $(M_T \times J)^{th}$ receiving buffer, wherein a matched filtering operation is performed on the over-sampling signal of the $K^{th}$ input terminal of the $(m')^{th}$ down-branch matched filter operating unit and a conjugate of the down-branch discrete training signal $s_d[MOD(K−m')]$ to obtain a $K^{th}$ down-branch matched operation result, wherein the $(m')^{th}$ down-branch matched filter operating unit combines all the down-branch matched operation results into the $(m')^{th}$ down-branch filter signal;

a down-branch time maximum ratio combining unit, which is coupled to the D down-branch matched filter operating units and the channel estimation unit, and performs a weight-product operation on the $I^{th}$ down-branch filter signal and a conjugate of the $I^{th}$ channel tap-weighting coefficient to obtain an $I^{th}$ down-branch time tap-weighting coefficient result, wherein the down-branch time maximum ratio combining unit combines all the down-branch time tap-weighting coefficient results into a down-branch time combining signal, wherein every predetermined time, the receiving buffer replaces the data of the $M^{th}$ storage unit with the data of the $(M-1)^{th}$ storage unit, and updates the first storage unit, and every predetermined time, a new down-branch time combining signal is generated, wherein the $Q^{th}$ down-branch time combining signal is generated in the $Q^{th}$ predetermined time;

a down-branch time decision unit, which is coupled to the down-branch time maximum ratio combining unit, collects R down-branch time combining signals, performs a maximum estimation on the R down-branch time combining signal, finds out a maximum down-branch time combining signal, and extracts a time index, corresponding to the maximum down-branch time combining signal, as a down-branch timing error estimation value; and a time average circuit, which is coupled to the up-branch time decision unit and the down-branch time decision unit, receives the timing error estimation value and the down-branch timing error estimation value, and performs an average operation to obtain an average timing error as the timing error estimation value.

5. The initial synchronization apparatus according to claim 4, wherein the frequency maximum ratio combining unit is an up-branch frequency maximum ratio combining unit, the array temporarily storing circuit is an up-branch array temporarily storing circuit, the Fourier transform unit is an up-branch Fourier transform unit, and the frequency decision unit is an up-branch frequency decision unit, wherein the initial synchronization apparatus further comprises:

a down-branch frequency maximum ratio combining unit, which is coupled to the D down-branch matched filter operating units and the channel estimation unit, and performs an weight-product operation on each of the down-branch matched operation results of the $P^{th}$ down-branch matched filter operating unit and a conjugate of the corresponding channel tap-weighting coefficient, wherein a weight-product operation is performed on the $U^{th}$ down-branch matched operation result of the $P^{th}$ down-branch matched filter operating unit and a conjugate of the $U^{th}$ channel tap-weighting coefficient to obtain a $U^{th}$ down-branch frequency tap-weighting coefficient result, wherein the down-branch frequency maximum ratio combining unit combines all the down-branch frequency tap-weighting coefficient results into a down-branch frequency combining vector, the down-branch frequency combining vector comprises D down-branch frequency combining signals, wherein the $V^{th}$ down-branch frequency combining signal is a sum of the $V^{th}$ down-branch frequency tap-weighting coefficient results corresponding to all the down-branch matched filter operating units, wherein every predetermined time, the receiving buffer replaces the data of the $M^{th}$ storage unit with the data of the $(M-1)^{th}$ storage unit, and updates the first storage unit, and every predetermined time, the down-branch frequency maximum ratio combining unit generates a new down-branch frequency combining vector, wherein the down-branch frequency maximum ratio combining unit generates a $Q^{th}$ down-branch frequency combining vector in the $Q^{th}$ predetermined time;

a down-branch array temporarily storing circuit, which is coupled to the frequency maximum ratio combining unit, and stores R down-branch frequency combining vectors;

a down-branch Fourier transform unit, which is coupled to the down-branch array temporarily storing circuit, extracts a specific down-branch frequency combining vector from the down-branch array temporarily storing circuit according to the timing error estimation value, performs a Fourier transform, and obtains multiple down-branch frequency domain transform signals;

a down-branch frequency decision unit, which is coupled to the down-branch Fourier transform unit, receives the multiple down-branch frequency domain transform signals, performs a maximum estimation on the multiple down-branch frequency domain transform signals, finds out a maximum down-branch frequency domain transform signal, and extracts a frequency index, corresponding to the maximum down-branch frequency domain transform signal, as a down-branch frequency offset estimation value; and a frequency average circuit, which is coupled to the up-branch frequency decision unit and the down-branch frequency decision unit, receives the frequency offset estimation value and the down-branch frequency offset estimation value, and performs an average operation to obtain an average frequency offset estimation value.

6. The initial synchronization apparatus according to claim 5, wherein the training sequence in the received signal is a dual-chirp burst, the dual-chirp burst is represented as s(t) in continuous time with a time range of (0, T), and an equation of s(t) is:

$$s(t) = \sqrt{\frac{E_T}{2}}(s_u(t) + s_d(t))$$

where $$s_u(t) = \sqrt{\frac{1}{T}} \exp\left(j\pi\mu\left(t - \frac{T}{2}\right)^2\right) \Pi\left(\frac{t - \frac{T}{2}}{T}\right)$$

$$s_d(t) = \sqrt{\frac{1}{T}} \exp\left(-j\pi\mu\left(t - \frac{T}{2}\right)^2\right) \Pi\left(\frac{t - \frac{T}{2}}{T}\right),$$

wherein $\Pi(t)$ is a unit rectangular pulse represented as $$\Pi(t) = \begin{cases} 1, & -\frac{1}{2} < t < \frac{1}{2} \\ 0, & \text{elsewhere.} \end{cases}$$

7. The initial synchronization apparatus according to claim 6, wherein a pulse response of the $(m')^{th}$ up-branch matched filter operating unit in continuous time is represented as $$h_{m';u}(t) =$$

$$s_u^*(T - t - m'T_s) = \frac{1}{\sqrt{T}}\exp\left(-j\pi\mu\left(\frac{T}{2} - t - m'T_s\right)^2\right)\Pi\left(\frac{\frac{T}{2} - t - m'T_s}{T}\right),$$

a pulse response of the $(m')^{th}$ down-branch matched filter operating unit in continuous time is represented as $$h_{m';d}(t) =$$

$$s_d^*(T - t - m'T_s) = \frac{1}{\sqrt{T}}\exp\left(+j\pi\mu\left(\frac{T}{2} - t - m'T_s\right)^2\right)\Pi\left(\frac{\frac{T}{2} - t - m'T_s}{T}\right),$$

$$m' = 0, 1, \ldots, D-1,$$

wherein the pulse response in discrete-time is represented as $$h_{m';u}[n] = s^*_{m';u}[D-1-n] = s^*_u((|D-1-n-m'|_D + \tfrac{1}{2})T_s)$$

$$h_{m';d}[n] = s^*_{m';d}[D-1-n] = s^*_d((|D-1-n-m'|_D + \tfrac{1}{2})T_s) \ n,$$
$$m'=0,1,\ldots,D-1$$

where $|x|_D$ represents a remainder obtained after x is divided by D.

8. The initial synchronization apparatus according to claim 5, wherein the matched operation results are up-branch matched operation results, the up-branch matched operation results generated by the $(m')^{th}$ up-branch matched filter operating unit are represented as $z_{m';u,0}, z_{m';u,1}, \ldots, z_{m';u,D-1}$, the up-branch matched operation results generated by the $(m')^{th}$ up-branch matched filter operating unit constitute a first vector, the first vector is represented as $\vec{z}_{m';u} = [z_{m';u,0} \ z_{m';u,1} \cdots z_{m';u,D-1}]^T$, the frequency combining vector is an up-branch frequency domain combining vector, the up-branch frequency domain combining vector is represented as $\vec{z}_u$, $\vec{z}_u = \hat{\alpha}^*_0 \cdot \vec{z}_{0;u} + \hat{\alpha}^*_1 \cdot \vec{z}_{1;u} + \ldots + \hat{\alpha}^*_{D-1} \cdot \vec{z}_{D-1;u}$, wherein $\hat{\alpha}^*_0, \hat{\alpha}^*_1, \ldots, \hat{\alpha}^*_{D-1}$ are the channel tap-weighting coefficients, wherein the down-branch matched operation results generated by the $(m')^{th}$ down-branch matched filter operating unit are represented as $z_{m';d,0}, z_{m';d,1}, \ldots, z_{m';d,D-1}$, the down-branch matched operation results generated by the $(m')^{th}$ down-branch matched filter operating unit constitute a second vector, the second vector is represented as $\vec{z}_{m';d} = [z_{m';d,0} \ z_{m';d,1} \ldots z_{m';d,D-1}]^T$, and the down-branch frequency domain combining vector is represented as $\vec{z}_d$, $\vec{z}_d = \hat{\alpha}^*_0 \cdot \vec{z}_{0;d} + \hat{\alpha}^*_1 \cdot \vec{z}_{1;d} + \ldots + \hat{\alpha}^*_{D-1} \cdot \vec{z}_{D-1;d}$.

9. The initial synchronization apparatus according to claim 1, wherein the matched filtering operation is a multiplication operation, and the weight-product operation is a multiplication operation.

10. An initial synchronization method comprising:

receiving a received signal, which comprises a training sequence;

sampling the received signal to obtain N over-sampling signals;

providing a receiving buffer, which has N storage units, and stores the $0^{th} \sim (N-1)^{th}$ over-sampling signals;

performing a channel estimation on the over-sampling signals according to a local training sequence to obtain D channel tap-weighting coefficients, wherein the local training sequence comprises D discrete training signals represented as s[0], s[1], ..., s[D-1];

performing D correlated operations to obtain D filter signals, wherein the over-sampling signal of the $(M_T \times J)^{th}$ receiving buffer is received in each correlated operation to perform D correlated operations over D over-sampling signals, wherein J=0,1,2,3, ..., D-1, wherein each correlated operation comprises a plurality of filtering operations and a combination operation, the $K^{th}$ filtering operations of the $(m')^{th}$ correlated operation is a matched filtering operation which is performed on the $(M_T \times K)^{th}$ over-sampling signal and a conjugate of the discrete training signal s[MOD(K−m')] to obtain a $K^{th}$ matched operation result, wherein the $(m')^{th}$ combination operation combines all the matched operation results of the $(m')^{th}$ correlated operation into a $(m')^{th}$ filter signal, where MOD(x) represents a remainder obtained after x is divided by D;

performing a time maximum ratio combining operation, which performs a weight-product operation on the $I^{th}$ filter signal and a conjugate of the $I^{th}$ channel tap-weighting coefficient to obtain an $I^{th}$ time tap-weighting coefficient result, and the time maximum ratio combining operation combines all the time tap-weighting coefficient results into a time combining signal, wherein every predetermined time, the receiving buffer replaces data of the $M^{th}$ storage unit with data of the $(M−1)^{th}$ storage unit, and updates the first storage unit, and every predetermined time, a new time combining signal is generated, wherein the $Q^{th}$ time combining signal is generated in the $Q^{th}$ predetermined time; and performing a time decision operation, which collects R time combining signals and performs a maximum estimation on the R time combining signals to find out a maximum time combining signal, and extracts a time index corresponding to the maximum time combining signal as a timing error estimation value;

where D, N, and $M_T$ are positive integers, $N \geq M_T \times D$, J, K, m', I are integers ranging from 0 to D−1, M is a positive integer, $2 \leq M \leq N$, R is a positive integer, and Q is a real number.

11. The initial synchronization method according to claim 10, wherein the local training sequence comprises an up-branch training sequence and a down-branch training sequence, the D correlated operations are D up-branch correlated operations, the time maximum ratio combining operation is an up-branch time maximum ratio combining operation, the time decision operation is an up-branch time decision operation, and the timing error estimation value is an up-branch timing error estimation value, wherein the down-branch training sequence comprises D down-branch discrete training signals, represented as $s_d[0], s_d[1], \ldots, s_d[D−1]$, and the initial synchronization method further comprises:

performing D down-branch correlated operations to obtain D down-branch filter signals, wherein the over-sampling signal of the $(M_T \times J)^{th}$ receiving buffer is received in each correlated operation to perform D down-branch correlated operations over D over-sampling signals, wherein J=0,1,2,3, . . . , D−1, wherein each correlated operation comprises a plurality of down-branch filtering operations and a down-branch combination operation, the $K^{th}$ down-branch filtering operations of the $(m')^{th}$ down-branch correlated operation is a matched filtering operation which is performed on the $(M_T \times K)^{th}$ over-sampling signal and a conjugate of the discrete training signal s[MOD(K−m')] to obtain a $K^{th}$ down-branch matched operation result, wherein the $(m')^{th}$ down-branch combination operation combines all the down-branch matched operation results of the $(m')^{th}$ down-branch correlated operation into a $(m')^{th}$ down-branch filter signal;

performing a down-branch time maximum ratio combining operation, which performs a weight-product operation on the $I^{th}$ down-branch filter signal and a conjugate of the $I^{th}$ channel tap-weighting coefficient to obtain an $I^{th}$ down-branch time tap-weighting coefficient result, and the down-branch time maximum ratio combining operation combines all the down-branch time tap-weighting coefficient results into a down-branch time combining signal, wherein every predetermined time, the receiving buffer replaces data of the $M^{th}$ storage unit with data of the $(M−1)^{th}$ storage unit, and updates the first storage unit, and every predetermined time, a new down-branch time combining signal is generated, wherein the $Q^{th}$ down-branch time combining signal is generated in the $Q^{th}$ predetermined time; and performing a down-branch time decision operation, which collects R down-branch time combining signals and performs a maximum estimation on the R time combining signals to find out a down-branch maximum time combining signal, and extracts a time index corresponding to the down-branch maximum time combining signal as a down-branch timing error estimation value; and performing an average operation on the up-branch timing error estimation value and the down-branch timing error estimation value to obtain an average timing error as the timing error estimation value.

12. The initial synchronization method according to claim 10, further comprising:

performing a frequency maximum ratio combining operation, which performs a weight-product operation on each of the matched operation results of the $P^{th}$ correlated operation and a conjugate of the corresponding channel tap-weighting coefficient, wherein the weight-product operation is performed on the $U^{th}$ matched operation result of the $P^{th}$ correlated operation and a conjugate of the $U^{th}$ channel tap-weighting coefficient to obtain the $U^{th}$ frequency tap-weighting coefficient result, wherein in the frequency maximum ratio combining operation, all the frequency tap-weighting coefficient results are combined into a frequency combining vector, and the frequency combining vector comprises D frequency combining signals, wherein the $V^{th}$ frequency combining signal is a sum of the $V^{th}$ frequency tap-weighting coefficient results corresponding to all the correlated operations, wherein every predetermined time, the receiving buffer replaces the data of the $M^{th}$ storage unit with the data of the $(M−1)^{th}$ storage unit, and updates the first storage unit, and every predetermined time, a new frequency combining vector is generated, wherein the $Q^{th}$ frequency combining vector is generated in the $Q^{th}$ predetermined time;

collecting R frequency combining vectors;

extracting a specific frequency combining vector from the R frequency combining vectors according to the timing error estimation value and performing a Fourier transform on the specific frequency combining vector to obtain a plurality of frequency domain transform signals; and performing a maximum estimation on the frequency domain transform signals to find out a maximum frequency domain transform signal, and extracting a frequency index corresponding to the maximum frequency domain transform signal, as a frequency offset estimation value;

where P, U and V are integers ranging from 0 to D−1.

13. The initial synchronization method according to claim 12, wherein the local training sequence comprises an up-branch training sequence and a down-branch training sequence, the D correlated operations are D up-branch correlated operations, the time maximum ratio combining operation is an up-branch time maximum ratio combining operation, the time decision operation is an up-branch time decision operation, and the timing error estimation value is an up-branch timing error estimation value, wherein the down-branch training sequence comprises D down-branch discrete training signals, represented as $s_d[0], s_d[1], \ldots, s_d[D-1]$, and the initial synchronization method further comprises:

performing D down-branch correlated operations to obtain D down-branch filter signals, wherein the over-sampling signal of the $(M_T \times J)^{th}$ receiving buffer is received in each correlated operation to perform D down-branch correlated operations over D over-sampling signals, wherein $J=0,1,2,3,\ldots,D-1$, wherein each correlated operation comprises a plurality of down-branch filtering operations and a down-branch combination operation, the $K^{th}$ down-branch filtering operations of the $(m')^{th}$ down-branch correlated operation is a matched filtering operation which is performed on the $(M_T \times K)^{th}$ over-sampling signal and a conjugate of the discrete training signal $s[MOD(K-m')]$ to obtain a $K^{th}$ down-branch matched operation result, wherein the $(m')^{th}$ down-branch combination operation combines all the down-branch matched operation results of the $(m')^{th}$ down-branch correlated operation into a $(m')^{th}$ down-branch filter signal;

performing a down-branch time maximum ratio combining operation, which performs a weight-product operation on the $I^{th}$ down-branch filter signal and a conjugate of the $I^{th}$ channel tap-weighting coefficient to obtain an $I^{th}$ down-branch time tap-weighting coefficient result, and the down-branch time maximum ratio combining operation combines all the down-branch time tap-weighting coefficient results into a down-branch time combining signal, wherein every predetermined time, the receiving buffer replaces data of the $M^{th}$ storage unit with data of the $(M-1)^{th}$ storage unit, and updates the first storage unit, and every predetermined time, a new down-branch time combining signal is generated, wherein the $Q^{th}$ down-branch time combining signal is generated in the $Q^{th}$ predetermined time; and performing a down-branch time decision operation, which collects R down-branch time combining signals and performs a maximum estimation on the R time combining signals to find out a down-branch maximum time combining signal, and extracts a time index corresponding to the down-branch maximum time combining signal as a down-branch timing error estimation value; and performing an average operation on the up-branch timing error estimation value and the down-branch timing error estimation value to obtain an average timing error as the timing error estimation value.

14. The initial synchronization method according to claim 13, wherein the frequency maximum ratio combining operation is an up-branch frequency maximum ratio combining operation, the frequency combining vector is an up-branch frequency combining vector, the frequency domain transform signals are a plurality of up-branch frequency domain transform signals, and the frequency offset estimation value is an up-branch frequency offset estimation value, wherein the initial synchronization method further comprises:

performing a down-branch frequency maximum ratio combining operation, which performs a weight-product operation on each of the down-branch matched operation results of the $P^{th}$ down-branch correlated operation and a conjugate of the corresponding channel tap-weighting coefficient, wherein the weight-product operation is performed on the $U^{th}$ down-branch matched operation result of the $P^{th}$ down-branch correlated operation and a conjugate of the $U^{th}$ channel tap-weighting coefficient to obtain the $U^{th}$ down-branch frequency tap-weighting coefficient result, wherein in the down-branch frequency maximum ratio combining operation, all the down-branch frequency tap-weighting coefficient results are combined into a down-branch frequency combining vector, and the down-branch frequency combining vector comprises D down-branch frequency combining signals, wherein the $V^{th}$ down-branch frequency combining signal is a sum of the $V^{th}$ down-branch frequency tap-weighting coefficient results corresponding to all the correlated operations, wherein every predetermined time, the receiving buffer replaces the data of the $M^{th}$ storage unit with the data of the $(M-1)^{th}$ storage unit, and updates the first storage unit, and every predetermined time, a new down-branch frequency combining vector is generated, wherein the $Q^{th}$ down-branch frequency combining vector is generated in the $Q^{th}$ predetermined time;

collecting R down-branch frequency combining vectors;

extracting a specific down-branch frequency combining vector from the R down-branch frequency combining vectors according to the timing error estimation value and performing a Fourier transform on the specific down-branch frequency combining vector to obtain a plurality of down-branch frequency domain transform signals;

performing a maximum estimation on the down-branch frequency domain transform signals to find out a maximum down-branch frequency domain transform signal, and extracting a frequency index corresponding to the maximum down-branch frequency domain transform signal, as a down-branch frequency offset estimation value; and performing an average operation on the up-branch frequency offset estimation value and the down-branch frequency offset estimation value to obtain an average frequency offset estimation value.

15. The initial synchronization method according to claim 14, wherein the training sequence in the received signal is a dual-chirp burst, the dual-chirp burst is represented as s(t) in continuous time with a time range of (0, T), and an equation of s(t) is:

$$s(t) = \sqrt{\frac{E_T}{2}} (s_u(t) + s_d(t))$$

where, $$s_u(t) = \sqrt{\frac{1}{T}} \exp\left(j\pi\mu\left(t - \frac{T}{2}\right)^2\right) \Pi\left(\frac{t - \frac{T}{2}}{T}\right)$$

$$s_d(t) = \sqrt{\frac{1}{T}} \exp\left(-j\pi\mu\left(t - \frac{T}{2}\right)^2\right) \Pi\left(\frac{t - \frac{T}{2}}{T}\right),$$

wherein $\Pi(t)$ is a unit rectangular pulse represented as $$\Pi(t) = \begin{cases} 1, & -\frac{1}{2} < t < \frac{1}{2} \\ 0, & \text{elsewhere.} \end{cases}$$

16. The initial synchronization method according to claim 14, wherein the matched operation results are up-branch matched operation results, the up-branch matched operation results generated by the $(m')^{th}$ up-branch correlated operation are represented as $z_{m';u,0}, z_{m';u,1}, \ldots, z_{m';u,D-1}$, the up-branch matched operation results generated by the $(m')^{th}$ up-branch correlated operation constitute a first vector, the first vector is represented as $\vec{z}_{m';u} = [z_{m';u,0} \; z_{m';u,1} \; \ldots \; z_{m';u,D-1}]^T$, the frequency combining vector is an up-branch frequency domain combining vector, the up-branch frequency domain combining vector is represented as $\vec{z}_u$, $\vec{z}_u = \hat{\alpha}^*_0 \cdot \vec{z}_{0;u} + \hat{\alpha}^*_1 \cdot \vec{z}_{1;u} + \ldots + \hat{\alpha}^*_{D-1} \cdot \vec{z}_{D-1;u}$, wherein $\hat{\alpha}^*_0, \hat{\alpha}^*_1, \ldots, \hat{\alpha}^*_{D-1}$ are the channel tap-weighting coefficients, wherein the down-branch matched operation results generated by the $(m')^{th}$ down-branch correlated operation are represented as $z_{m';d,0}, z_{m';d,1}, \ldots, z_{m';d,D-1}$, the down-branch matched operation results generated by the $(m')^{th}$ down-branch correlated operation constitute a second vector, the second vector is represented as $\vec{z}_{m';d} = [z_{m';d,0} \; z_{m';d,1} \; \ldots \; z_{m';d,D-1}]^T$, and the down-branch frequency domain combining vector is represented as $\vec{z}_d$, $\vec{z}_d = \hat{\alpha}^*_0 \cdot \vec{z}_{0;d} + \hat{\alpha}^*_1 \cdot \vec{z}_{1;d} + \ldots + \hat{\alpha}^*_{D-1} \cdot \vec{z}_{D-1;d}$.

17. The initial synchronization method according to claim 10, wherein the matched filtering operation is a multiplication operation, and the weight-product operation is a multiplication operation.

* * * * *